United States Patent
Sethuraman et al.

(10) Patent No.: US 12,184,862 B2
(45) Date of Patent: Dec. 31, 2024

(54) DEVICE AND METHOD FOR COMPUTING POSITION OF INTEGER GRID REFERENCE SAMPLE FOR BLOCK LEVEL BOUNDARY SAMPLE GRADIENT COMPUTATION

(71) Applicant: Huawei Technologies Co., Ltd., Guangdong (CN)

(72) Inventors: Sriram Sethuraman, Bangalore (IN); Jeeva Raj A, Rasipuram (IN); Sagar Kotecha, Beed (IN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 169 days.

(21) Appl. No.: 17/645,608

(22) Filed: Dec. 22, 2021

(65) Prior Publication Data
US 2022/0116624 A1   Apr. 14, 2022

Related U.S. Application Data

(63) Continuation of application No. PCT/CN2020/097762, filed on Jun. 23, 2020.

(30) Foreign Application Priority Data

Jun. 24, 2019   (IN) .............................. 201931025013

(51) Int. Cl.
*H04N 19/137* (2014.01)
*H04N 19/105* (2014.01)
(Continued)

(52) U.S. Cl.
CPC ......... *H04N 19/137* (2014.11); *H04N 19/105* (2014.11); *H04N 19/132* (2014.11); *H04N 19/159* (2014.11); *H04N 19/176* (2014.11)

(58) Field of Classification Search
None
See application file for complete search history.

(56) References Cited

U.S. PATENT DOCUMENTS

2002/0145613 A1* 10/2002 MacInnis ........... H04N 21/4438
                                                           348/E5.062
2007/0098071 A1*  5/2007 Ohgose ................ H04N 19/61
                                                           375/E7.266
(Continued)

FOREIGN PATENT DOCUMENTS

JP      2013543318 A     11/2013
JP      2022540771 A      9/2022
(Continued)

OTHER PUBLICATIONS

Document: JVET-K0275-v2, Semih Esenlik et al, Non-CE9: DMVR without Intermediate Buffers and with Padding, Joint Video Experts Team (JVET) of ITU-T SG 16 WP 3 and ISO/IECJTC 1/SC 29/WG11, 11th Meeting: Ljubljana, SI, Jul. 10-18, 2018, 4 pages.
(Continued)

*Primary Examiner* — Mohammad J Rahman
(74) *Attorney, Agent, or Firm* — WOMBLE BOND DICKINSON (US) LLP

(57) ABSTRACT

A method for bi-directional optical flow prediction based on reference sample values from sample positions belonging to an extended region of a predicted block used in the bi-directional optical flow prediction of a current block is provided, wherein sub-pixel positions in the extended region of the predicted block in the reference picture are rounded to obtain integer pixel sample positions in the reference picture, wherein the reference sample values at the obtained integer pixel sample positions in the reference picture are used in the computation of boundary sample gradients corresponding to the boundaries of the predicted block in the reference picture.

19 Claims, 10 Drawing Sheets

(51) Int. Cl.
*H04N 19/132* (2014.01)
*H04N 19/159* (2014.01)
*H04N 19/176* (2014.01)

(56) References Cited

U.S. PATENT DOCUMENTS

| | | | | |
|---|---|---|---|---|
| 2010/0177827 A1* | 7/2010 | Sroka | ............... | H04N 19/43 |
| | | | | 375/240.16 |
| 2011/0211635 A1* | 9/2011 | Amano | ............... | H04N 19/895 |
| | | | | 375/E7.135 |
| 2012/0183070 A1* | 7/2012 | Pateux | ............... | H04N 19/109 |
| | | | | 375/E7.125 |
| 2012/0300845 A1* | 11/2012 | Endresen | ............... | H04N 19/557 |
| | | | | 375/E7.125 |
| 2013/0022109 A1* | 1/2013 | Kanou | ............... | H04N 19/136 |
| | | | | 375/E7.113 |
| 2013/0272410 A1* | 10/2013 | Seregin | ............... | H04N 19/176 |
| | | | | 375/240.16 |
| 2013/0342644 A1* | 12/2013 | Rusanovskyy | ...... | H04N 19/597 |
| | | | | 348/43 |
| 2014/0098418 A1* | 4/2014 | Lin | ............... | G02B 30/29 |
| | | | | 359/462 |
| 2014/0341297 A1* | 11/2014 | Chien | ............... | H04N 19/13 |
| | | | | 375/240.16 |
| 2016/0191946 A1* | 6/2016 | Zhou | ............... | H04N 19/17 |
| | | | | 375/240.16 |
| 2017/0127062 A1* | 5/2017 | Zhao | ............... | H04N 19/126 |
| 2017/0244981 A1* | 8/2017 | Chen | ............... | H04N 19/117 |
| 2018/0048909 A1* | 2/2018 | Liu | ............... | H04N 19/105 |
| 2018/0103252 A1* | 4/2018 | Hsieh | ............... | H04N 19/176 |
| 2018/0262773 A1 | 9/2018 | Chuang et al. | | |
| 2019/0082193 A1* | 3/2019 | Sun | ............... | H04N 19/82 |
| 2019/0089975 A1 | 3/2019 | Liu et al. | | |
| 2019/0158843 A1* | 5/2019 | Xu | ............... | H04N 19/172 |
| 2020/0154126 A1* | 5/2020 | Li | ............... | H04N 19/513 |
| 2020/0236362 A1* | 7/2020 | Lee | ............... | H04N 19/159 |
| 2021/0092439 A1* | 3/2021 | Ikai | ............... | H04N 19/56 |

FOREIGN PATENT DOCUMENTS

| | | |
|---|---|---|
| KR | 20110026020 A | 3/2011 |
| KR | 20140089486 A | 7/2014 |
| WO | 2007091213 A2 | 8/2007 |
| WO | 2018156628 A1 | 8/2018 |
| WO | 2019045427 A1 | 3/2019 |

OTHER PUBLICATIONS

Document: JVET-O0096-v1, Sriram Sethuraman et al, CE9-1.5: Best DMVR cost based early termination for BDOF, Joint Video Experts Team (JVET) of ITU-T SG 16 WP 3 and ISO/IECJTC 1/SC 29/WGII 15th Meeting: Gothenburg, SE, Jul. 3-12, 2019, 4 pages.
Document: JVET-L0256_v2, Xiaoyu Xiu et al, CE9-related: Complexity reduction and bit-width control for bi-directional optical flow (BIO), Joint Video Experts Team (JVET) of ITU-T SG 16 WP 3 and ISO/IECJTC 1/SC 29/WG11, 12th Meeting: Macao, CN, Oct. 3-12, 2018, 15 pages.
Document: JVET-M1000-v1, Gary Sullivan et al, Meeting Report of the 13th Meeting of the Joint Video Experts Team (JVET), Marrakech, MA, Jan. 9-18, 2019, Joint Video Experts Team (JVET) of ITU-T SG 16 WP 3 and ISO/IECJTC 1/SC 29/WGII 13th Meeting: Marrakech, MA, Jan. 9-18, 2019, 357 pages.
ITU-T H.264(Apr. 2017), Series H: Audiovisual and Multimedia Systems, Infrastructure of audiovisual services-Coding of moving video, Advanced video coding for generic audiovisual services, total 812 pages.
Document: JVET-M0487, Xiaoyu Xiu et al, CE9.1: Simplifications on bi-directional optical flow (BDOF), Joint Video Experts Team (JVET) of ITU-T SG 16 WP 3 and ISO/IEC JTC 1/SC 29/WG 11, 13th Meeting: Marrakech, MA, Jan. 9-18, 2019, total 4 pages.
ITU-T H.265(Feb. 2018), Series H: Audiovisual and Multimedia Systems Infrastructure of audiovisual services-Coding of moving video, High efficiency video coding, total 692 pages.
Document: JVET-M1001-v3, Benjamin Bross et al, Versatile Video Coding (Draft 4), Joint Video Experts Team (JVET) of ITU-T SG 16 WP 3 and ISO/IEC JTC 1/SC 29/WG 11, 13th Meeting: Marrakech, MA, Jan. 9-18, 2019, total 254 pages.
Document: JVET-N1001-v8, Benjamin Bross et al., Versatile Video Coding (Draft 5), Joint Video Experts Team (JVET) of ITU-T SG 16 WP 3 and ISO/IEC JTC 1/SC 29/WG 11, 14th Meeting: Geneva, CH, Mar. 19-27, 2019, tota 400 pages.
Sriram Sethuraman, CE9-related: A SIMD-friendly simplification for BDOF, JVET-N0312-v2, Mar. 20, 2019 3 Pages.
Tzu-Der Chuang et al: CE4-related: MV rounding unification , JVET of ITU-T and ISO/IEC, JVET-N0085-v1 (Mar. 12, 2019), 3 pages.
Wedi T: "Hybrid Video Coding Based On High-Resolution Displacement Vectors", Proceedings of SPIE, IEEE, US, vol. 4310, Jan. 24, 2001 (Jan. 24, 2001) , pp. 186-193, XP008004832.

* cited by examiner

DEVICE AND METHOD FOR COMPUTING POSITION OF INTEGER GRID REFERENCE SAMPLE FOR BLOCK LEVEL BOUNDARY SAMPLE GRADIENT COMPUTATION

CROSS-REFERENCE TO RELATED APPLICATIONS

This application is a continuation of International Application No. PCT/CN2020/097762, filed on Jun. 23, 2020, which claims priority to Indian patent application IN201931025013, filed on Jun. 24, 2019. The disclosures of the aforementioned applications are hereby incorporated by reference in their entireties.

TECHNICAL FIELD

Embodiments of the present application generally relate to the field of picture processing and more particularly to optical flow refinement.

BACKGROUND

Video coding (video encoding and decoding) is used in a wide range of digital video applications, for example broadcast digital TV, video transmission over internet and mobile networks, real-time conversational applications such as video chat, video conferencing, DVD and Blu-ray discs, video content acquisition and editing systems, and camcorders of security applications.

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in picture quality are desirable.

SUMMARY OF THE DISCLOSURE

Embodiments of the present application provide apparatuses and methods for encoding and decoding according to the independent claims.

The foregoing and other objects are achieved by the subject matter of the independent claims. Further embodiments are apparent from the dependent claims, the description and the figures.

A first embodiment of the present disclosure provides a method, implemented by an encoding device or a decoding device, for bi-directional optical flow prediction based on a sample value from a sample position belonging to an extended region of a predicted block used in the bi-directional optical flow prediction of a current block, wherein the method comprises obtaining a motion vector (MV) of the current block, obtaining a sub-pixel sample position in the extended region of the predicted block in the reference picture based on the MV, processing the obtained sub-pixel sample position to obtain an integer pixel sample position in the reference picture, and performing bi-directional optical flow prediction by referring to a reference sample value at the obtained integer pixel sample position in the reference picture.

Processing the obtained sub-pixel sample position to obtain an integer pixel sample position in the reference picture may reduce the memory footprint for bi-directional optical flow (BDOF) prediction and allow a sub-block level pipeline to be established in hardware designs as the extended sample values (i.e. the sample positions that fall outside the M×N sample positions corresponding to a sub-block) are not obtained through motion compensated interpolation of the respective reference samples.

The reference sample value at the obtained integer pixel sample position in the reference picture may be referred to as the sample value from the sub-pixel sample position in the bi-directional optical flow prediction.

Processing the obtained sub-pixel sample position may include rounding the obtained sub-pixel sample position to obtain the integer pixel sample position in the reference picture.

By rounding the sub-pel position in the horizontal and vertical directions, the boundary gradients may be more accurate. This may improve the computed optical flow based on these sample gradients and also the corrections applied using the computed optical flow. This may offer a consistent coding gain when compared to the earlier method of ignoring the fractional offset in the horizontal and vertical directions when selecting the integer sample value for the extended sample positions. At the same time, the complexity may not be increased much as the addition of a horizontal and vertical rounding offset is the only increase in complexity.

Processing the obtained sub-pixel sample position may include rounding the obtained sub-pixel sample position separately in a horizontal direction and a vertical direction to a respective closest integer pixel sample position in the respective direction and obtaining the integer pixel sample position in the reference picture based on the closest integer pixel sample positions in the horizontal direction and the vertical direction.

The method may further comprise, before performing the bi-directional optical flow prediction, fetching the reference sample value at the obtained integer pixel sample position in the reference picture as a prediction sample value to be used in the bi-directional optical flow prediction, wherein the performing bi-directional optical flow prediction referring to a reference sample value comprises performing bi-directional optical flow prediction using the prediction sample value.

According to an embodiment, rounding the obtained sub-pixel sample position separately in the horizontal direction and the vertical direction may include comparing a fractional part of the obtained sub-pixel sample position in the respective direction with a threshold, wherein in a case that the fractional part is equal to or larger than the threshold, a nearest higher integer pixel sample position in the respective direction is obtained as the closest integer pixel sample position in the respective direction, and wherein in a case that the fractional part is smaller than the threshold, a nearest lower integer pixel sample position in the respective direction is obtained as the closest integer pixel sample position in the respective direction.

The nearest higher integer pixel sample position in the respective direction may be obtained by adding an offset of 1 to a truncated integer pixel sample position in the respective direction obtained by discarding the fractional part of the obtained sub-pixel sample position, and the nearest lower integer pixel sample position in the respective direction may be obtained by adding an offset of 0 to the truncated integer pixel sample position in the respective direction obtained by discarding the fractional part of the obtained sub-pixel sample position.

The threshold may be given by P/2 for a 1/P pel sub-pixel accuracy. The threshold may be 8 for 1/16 pel sub-pixel accuracy.

According to an embodiment, rounding the obtained sub-pixel sample position separately in the horizontal direction and the vertical direction may include applying a shifting operation and an inverse shifting operation to components of the obtained sub-pixel sample position in the respective directions.

The integer pixel sample position (x_pos, y_pos) in the reference picture may be obtained according to the following equations:

$$x\_pos = (x\_spel\_pos + (1 << (shift\_val - 1))) >> shift\_val$$
$$y\_pos = (y\_spel\_pos + (1 << (shift\_val - 1))) >> shift\_val$$

where (x_spel_pos, y_spel_pos) is the obtained sub-pixel sample position and shift_val is chosen according to the sub-pel sample accuracy used. For sub-pel sample accuracy of half-pel, quarter-pel, $1/8^{th}$ of a pel, or $1/16^{th}$ of a pel, shift_val of 1, 2, 3, or 4 may be used, respectively.

According to an embodiment, the MV of the current block may be a refined MV, obtained by motion vector refinement (MVR) on the basis of an initial MV.

The MVR may comprises an integer-distance refinement stage with regard to the initial MV, wherein, in case the integer-distance refinement stage of the MVR results in a non-zero displacement of the refined MV with respect to the initial MV, the integer pixel sample position in the reference picture may be obtained by rounding the obtained sub-pixel sample position.

In case the integer-distance refinement stage of the MVR results in a zero displacement of the refined MV with respect to the initial MV, the integer pixel sample position in the reference picture may be obtained by discarding a fractional part of the obtained sub-pixel sample position.

According to an embodiment, in case the integer-distance refinement stage of the MVR results in a zero displacement of the refined MV with respect to the initial MV, the integer pixel sample position (x_pos, y_pos) in the reference picture may be obtained according to the following equations:

$$x\_pos = x\_spel\_pos >> shift\_val$$
$$y\_pos = y\_spel\_pos >> shift\_val$$

where (x_spel_pos, y_spel_pos) is the obtained sub-pixel sample position and shift_val is chosen according to the sub-pel sample accuracy used. For sub-pel sample accuracy of half-pel, quarter-pel, $1/8^{th}$ of a pel, or $1/16^{th}$ of a pel, shift_val of 1, 2, 3, or 4 may be used, respectively.

The current block may be a current coding block or a current coding sub-block or a current prediction block.

The reference sample value at the obtained integer pixel sample position in the reference picture may be used in the computation of a boundary sample gradient corresponding to a boundary of the predicted block in the reference picture.

According to an aspect of the first embodiment, an encoder is provided comprising processing circuitry for carrying out any one of the methods according to the first embodiment.

According to a further aspect of the first embodiment, a decoder is provided comprising processing circuitry for carrying out any one of the methods according to the first embodiment.

According to a further aspect of the first embodiment, a computer program product is provided comprising instructions which, when the program is executed by a computer, cause the computer to carry out any one of the methods according to the first embodiment.

According to a further aspect of the first embodiment, an encoder is provided, comprising one or more processors, and a non-transitory computer-readable storage medium coupled to the one or more processors and storing instructions for execution by the one or more processors, wherein the instructions, when executed by the one or more processors, configure the encoder to carry out any one of the methods according to the first embodiment.

According to a further aspect of the first embodiment, a decoder is provided, comprising one or more processors, and a non-transitory computer-readable storage medium coupled to the one or more processors and storing instructions for execution by the one or more processors, wherein the instructions, when executed by the one or more processors, configure the decoder to carry out any one of the methods according to the first embodiment.

According to a further aspect of the first embodiment, an encoder is provided, comprising a prediction unit configured to perform bi-directional optical flow prediction of a current block, a first obtaining unit configured to obtain a motion vector (MV) of the current block, a second obtaining unit configured to obtain a sub-pixel sample position in an extended region of a predicted block in a reference picture based on the MV, and a processing unit configured to process the obtained sub-pixel sample position to obtain an integer pixel sample position in the reference picture, wherein the prediction unit is configured to perform the bi-directional optical flow prediction by referring to a reference sample value at the obtained integer pixel sample position in the reference picture.

According to an embodiment, processing the obtained sub-pixel sample position may include rounding the obtained sub-pixel sample position to obtain the integer pixel sample position in the reference picture.

According to an embodiment, processing the obtained sub-pixel sample position may include rounding the obtained sub-pixel sample position separately in a horizontal direction and a vertical direction to a respective closest integer pixel sample position in the respective direction and obtaining the integer pixel sample position in the reference picture based on the closest integer pixel sample positions in the horizontal direction and the vertical direction.

Rounding the obtained sub-pixel sample position separately in the horizontal direction and the vertical direction may include comparing a fractional part of the obtained sub-pixel sample position in the respective direction with a threshold, wherein in a case that the fractional part is equal to or larger than the threshold, a nearest higher integer pixel sample position in the respective direction may be obtained as the closest integer pixel sample position in the respective direction, and wherein in a case that the fractional part is smaller than the threshold, a nearest lower integer pixel sample position in the respective direction may be obtained as the closest integer pixel sample position in the respective direction.

The nearest higher integer pixel sample position in the respective direction may be obtained by adding an offset of 1 to a truncated integer pixel sample position in the respective direction obtained by discarding the fractional part of the obtained sub-pixel sample position, and the nearest lower integer pixel sample position in the respective direction may be obtained by adding an offset of 0 to the truncated integer pixel sample position in the respective direction obtained by discarding the fractional part of the obtained sub-pixel sample position.

According to a further aspect of the first embodiment, a decoder is provided, comprising a prediction unit configured to perform bi-directional optical flow prediction of a current block, a first obtaining unit configured to obtain a motion vector (MV) of the current block from a bitstream of an encoded video, a second obtaining unit configured to obtain a sub-pixel sample position in an extended region of a predicted block in a reference picture based on the MV, and a processing unit configured to process the obtained sub-pixel sample position to obtain an integer pixel sample position in the reference picture, wherein the prediction unit is configured to perform the bi-directional optical flow prediction by referring to a reference sample value at the obtained integer pixel sample position in the reference picture.

According to an embodiment, processing the obtained sub-pixel sample position may include rounding the obtained sub-pixel sample position to obtain the integer pixel sample position in the reference picture.

According to an embodiment, processing the obtained sub-pixel sample position may include rounding the obtained sub-pixel sample position separately in a horizontal direction and a vertical direction to a respective closest integer pixel sample position in the respective direction and obtaining the integer pixel sample position in the reference picture based on the closest integer pixel sample positions in the horizontal direction and the vertical direction.

Rounding the obtained sub-pixel sample position separately in the horizontal direction and the vertical direction may include comparing a fractional part of the obtained sub-pixel sample position in the respective direction with a threshold, wherein in a case that the fractional part is equal to or larger than the threshold, a nearest higher integer pixel sample position in the respective direction may be obtained as the closest integer pixel sample position in the respective direction, and wherein in a case that the fractional part is smaller than the threshold, a nearest lower integer pixel sample position in the respective direction may be obtained as the closest integer pixel sample position in the respective direction.

The nearest higher integer pixel sample position in the respective direction may be obtained by adding an offset of 1 to a truncated integer pixel sample position in the respective direction obtained by discarding the fractional part of the obtained sub-pixel sample position, and the nearest lower integer pixel sample position in the respective direction may be obtained by adding an offset of 0 to the truncated integer pixel sample position in the respective direction obtained by discarding the fractional part of the obtained sub-pixel sample position.

According to a further aspect of the first embodiment, a storage medium is provided storing a bitstream which is obtained by using any one of the methods of the first embodiment.

A second embodiment of the present disclosure provides a method used for obtaining a predicted sample value for a sample position belonging to the extended region of a predicted block used in bi-directional optical flow prediction of a current coding block comprising obtaining a first MV corresponding to the predicted sample within the extended region of the coding block, obtaining a second MV by discarding the fractional part of the first MV, obtaining a first integer pixel location of the extended region in a reference picture based on the second MV, determining a fractional offset vector based on the first MV, and obtaining a second integer pixel location in the reference picture based on the first integer pixel location and the fractional offset vector, wherein the second integer pixel location is set to be the first integer pixel position plus a position offset, where the position offset is determined by comparison between each component of the fractional offset vector and a threshold, and further padding the predicted sample by using a pixel value in the second integer pixel location in the reference picture.

Whether a component of the position offset is 1 or 0 may depend on the result of the comparison between the corresponding component of the fractional offset vector and the threshold, wherein the component includes an X component and a Y component.

The threshold may be K, wherein a component of the position offset may be set to be 1 when the corresponding component of the fractional offset is equal to or bigger than K, otherwise, to be 0. K may be equal to 7.

According to an aspect of the second embodiment, an encoder or a decoder is provided comprising processing circuitry for carrying out any one of the methods according to the second embodiment.

According to a further aspect of the second embodiment, a computer program product is provided comprising a program code for performing any one of the methods according to the second embodiment.

According to a further aspect of the second embodiment, a decoder or an encoder is provided, comprising one or more processors, and a non-transitory computer-readable storage medium coupled to the processors and storing programming for execution by the processors, wherein the programming, when executed by the processors, configures the decoder or the encoder to carry out any one of the methods according to the second embodiment.

Details of one or more embodiments are set forth in the accompanying drawings and the description below. Other features, objects, and advantages will be apparent from the description, drawings, and claims.

BRIEF DESCRIPTION OF THE DRAWINGS

In the following, embodiments of the disclosure are described in more detail with reference to the attached figures and drawings, in which.

Figure 1A:
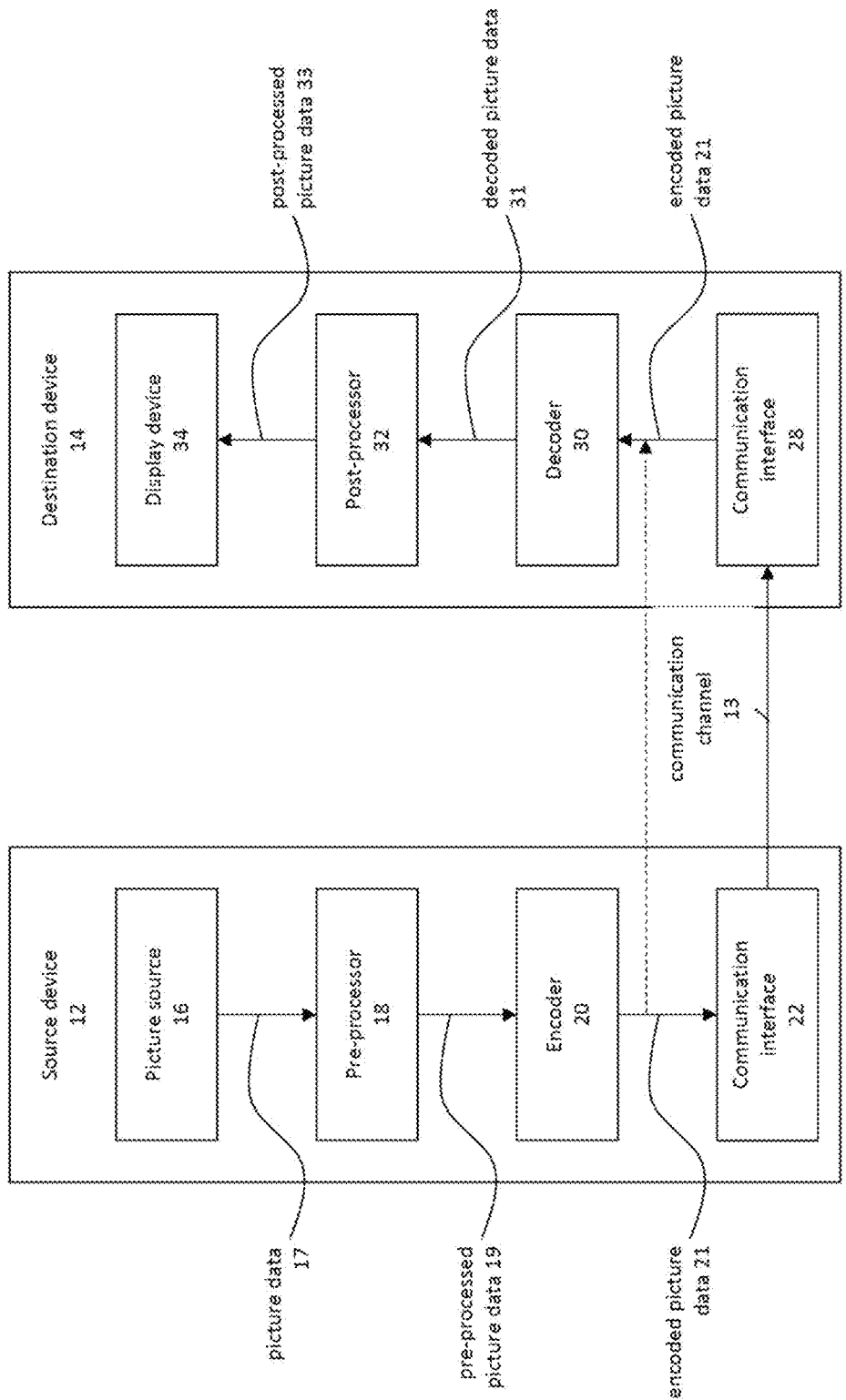
FIG. 1A is a block diagram showing an example of a video coding system configured to implement embodiments of the disclosure.

In the following, identical reference signs refer to identical or at least functionally equivalent features if not explicitly specified otherwise.

DETAILED DESCRIPTION OF THE EMBODIMENTS

In the following description, reference is made to the accompanying figures, which form part of the disclosure, and which show, by way of illustration, aspects of embodiments of the disclosure or aspects in which embodiments of the present disclosure may be used. It is understood that embodiments of the disclosure may be used in other aspects and comprise structural or logical changes not depicted in the figures. The following detailed description, therefore, is not to be taken in a limiting sense, and the scope of the present disclosure is defined by the appended claims.

For instance, it is understood that a disclosure in connection with a described method may also hold true for a corresponding device or system configured to perform the method and vice versa. For example, if one or a plurality of method operations are described, a corresponding device may include one or a plurality of units, e.g. functional units, to perform the described one or plurality of method operations (e.g. one unit performing the one or plurality of operations, or a plurality of units each performing one or more of the plurality of operations), even if such one or more units are not explicitly described or illustrated in the figures. On the other hand, for example, if an apparatus is described based on one or a plurality of units, e.g. functional units, a corresponding method may include one operation to perform the functionality of the one or plurality of units (e.g. one operation performing the functionality of the one or plurality of units, or a plurality of operations each performing the functionality of one or more of the plurality of units), even if such one or plurality of operations are not explicitly described or illustrated in the figures. Further, it is understood that the features of the various exemplary embodiments and/or aspects described herein may be combined with each other, unless specifically noted otherwise.

Video coding typically refers to the processing of a sequence of pictures, which form the video or video sequence. Instead of the term "picture", the term "frame" or "image" may be used as synonyms in the field of video coding. Video coding (or coding in general) comprises two parts: video encoding and video decoding. Video encoding is performed at the source side, typically comprising processing (e.g. by compression) the original video pictures to reduce the amount of data required for representing the video pictures (for more efficient storage and/or transmission). Video decoding is performed at the destination side and typically comprises the inverse processing compared to the encoder to reconstruct the video pictures. Embodiments referring to "coding" of video pictures (or pictures in general) shall be understood to relate to "encoding" or "decoding" of video pictures or respective video sequences. The combination of the encoding part and the decoding part is also referred to as CODEC (Coding and Decoding).

In case of lossless video coding, the original video pictures can be reconstructed, i.e. the reconstructed video pictures have the same quality as the original video pictures (assuming no transmission loss or other data loss occurs during storage or transmission). In case of lossy video coding, further compression, e.g. by quantization, is performed, to reduce the amount of data representing the video pictures, which cannot be completely reconstructed at the decoder, i.e. the quality of the reconstructed video pictures is lower or worse compared to the quality of the original video pictures.

Several video coding standards belong to the group of "lossy hybrid video codecs" (i.e. combine spatial and temporal prediction in the sample domain and 2D transform coding for applying quantization in the transform domain). Each picture of a video sequence is typically partitioned into a set of non-overlapping blocks and the coding is typically performed on a block level. In other words, at the encoder the video is typically processed, i.e. encoded, on a block (video block) level, e.g. by using spatial (intra picture) prediction and/or temporal (inter picture) prediction to generate a prediction block, subtracting the prediction block from the current block (block currently processed/to be processed) to obtain a residual block, transforming the residual block and quantizing the residual block in the transform domain to reduce the amount of data to be transmitted (compression), whereas at the decoder the inverse processing compared to the encoder is applied to the encoded or compressed block to reconstruct the current block for representation. Furthermore, the encoder duplicates the decoder processing loop such that both will generate identical predictions (e.g. intra- and inter predictions) and/or re-constructions for processing, i.e. coding, the subsequent blocks.

In the following embodiments of a video coding system 10, a video encoder 20 and a video decoder 30 are described based on FIGS. 1 to 3.

FIG. 1A is a schematic block diagram illustrating an example coding system 10, e.g. a video coding system 10 (or short coding system 10) that may utilize techniques of this present application. Video encoder 20 (or short encoder 20) and video decoder 30 (or short decoder 30) of video coding system 10 represent examples of devices that may be configured to perform techniques in accordance with various examples described in the present application.

As shown in FIG. 1A, the coding system 10 comprises a source device 12 configured to provide encoded picture data 21 e.g. to a destination device 14 for decoding the encoded picture data 13.

The source device 12 comprises an encoder 20, and may additionally comprise a picture source 16, a pre-processor (or pre-processing unit) 18, e.g. a picture pre-processor 18, and a communication interface or communication unit 22.

The picture source 16 may comprise or be any kind of picture capturing device, for example a camera for capturing a real-world picture, and/or any kind of a picture generating device, for example a computer-graphics processor for generating a computer animated picture, or any kind of other device for obtaining and/or providing a real-world picture, a computer generated picture (e.g. a screen content, a virtual reality (VR) picture) and/or any combination thereof (e.g. an augmented reality (AR) picture). The picture source may be any kind of memory or storage storing any of the aforementioned pictures.

In distinction to the pre-processor 18 and the processing performed by the pre-processing unit 18, the picture or picture data 17 may also be referred to as raw picture or raw picture data 17.

Pre-processor 18 may be configured to receive the (raw) picture data 17 and to perform pre-processing on the picture data 17 to obtain a pre-processed picture 19 or pre-processed picture data 19. Pre-processing performed by the pre-processor 18 may, e.g., comprise trimming, color format conversion (e.g. from RGB to YCbCr), color correction, or de-noising. It can be understood that the pre-processing unit 18 may be an optional component.

The video encoder 20 may be configured to receive the pre-processed picture data 19 and provide encoded picture data 21 (further details will be described below, e.g., based on FIG. 2).

Communication interface 22 of the source device 12 may be configured to receive the encoded picture data 21 and to transmit the encoded picture data 21 (or any further processed version thereof) over communication channel 13 to another device, e.g. the destination device 14 or any other device, for storage or direct reconstruction.

The destination device 14 comprises a decoder 30 (e.g. a video decoder 30), and may additionally comprise a communication interface or communication unit 28, a post-processor 32 (or post-processing unit 32) and a display device 34.

The communication interface 28 of the destination device 14 may be configured to receive the encoded picture data 21 (or any further processed version thereof), e.g. directly from the source device 12 or from any other source, e.g. a storage device, such as an encoded picture data storage device, and provide the encoded picture data 21 to the decoder 30.

The communication interface 22 and the communication interface 28 may be configured to transmit or receive the encoded picture data 21 or encoded data 13 via a direct communication link between the source device 12 and the destination device 14, e.g. a direct wired or wireless connection, or via any kind of network, e.g. a wired or wireless network or any combination thereof, or any kind of private and public network, or any kind of combination thereof.

The communication interface 22 may be configured to package the encoded picture data 21 into an appropriate format, e.g. packets, and/or process the encoded picture data using any kind of transmission encoding or processing for transmission over a communication link or communication network.

The communication interface 28, forming the counterpart of the communication interface 22, may be configured to receive the transmitted data and process the transmission data using any kind of corresponding transmission decoding or processing and/or de-packaging to obtain the encoded picture data 21.

Both, communication interface 22 and communication interface 28 may be configured as unidirectional communication interfaces as indicated by the arrow for the communication channel 13 in FIG. 1A pointing from the source device 12 to the destination device 14, or as bi-directional communication interfaces, and may be configured to send and receive messages, e.g. to set up a connection, to acknowledge and exchange any other information related to the communication link and/or data transmission, such as encoded picture data transmission.

The decoder 30 may be configured to receive the encoded picture data 21 and provide decoded picture data 31 or a decoded picture 31 (further details will be described below, e.g., based on FIG. 3 or FIG. 5).

The post-processor 32 of destination device 14 may be configured to post-process the decoded picture data 31 (also called reconstructed picture data), e.g. the decoded picture 31, to obtain post-processed picture data 33, such as a post-processed picture 33. The post-processing performed by the post-processing unit 32 may comprise any one or more of color format conversion (e.g. from YCbCr to RGB), color correction, trimming, or re-sampling, or any other processing, e.g. for preparing the decoded picture data 31 for display, e.g. by display device 34.

The display device 34 of the destination device 14 may be configured to receive the post-processed picture data 33 for displaying the picture, e.g. to a user or viewer. The display device 34 may be or comprise any kind of display for representing the reconstructed picture, such as an integrated or external display or monitor. The display may be a liquid crystal displays (LCD), an organic light emitting diodes (OLED) display, a plasma display, a projector, a micro LED display, a liquid crystal on silicon (LCoS), a digital light processor (DLP) or any kind of other display.

Although FIG. 1A depicts the source device 12 and the destination device 14 as separate devices, embodiments of devices may also comprise both devices or both functionalities, i.e. the source device 12 or corresponding functionality and the destination device 14 or corresponding functionality. In such embodiments the source device 12 or corresponding functionality and the destination device 14 or corresponding functionality may be implemented using the same hardware and/or software or by separate hardware and/or software or any combination thereof.

As will be apparent for the skilled person based on the description, the existence and (exact) split of functionalities of the different units or functionalities within the source device 12 and/or destination device 14 as shown in FIG. 1A may vary depending on the actual device and application.

Figure 1B:
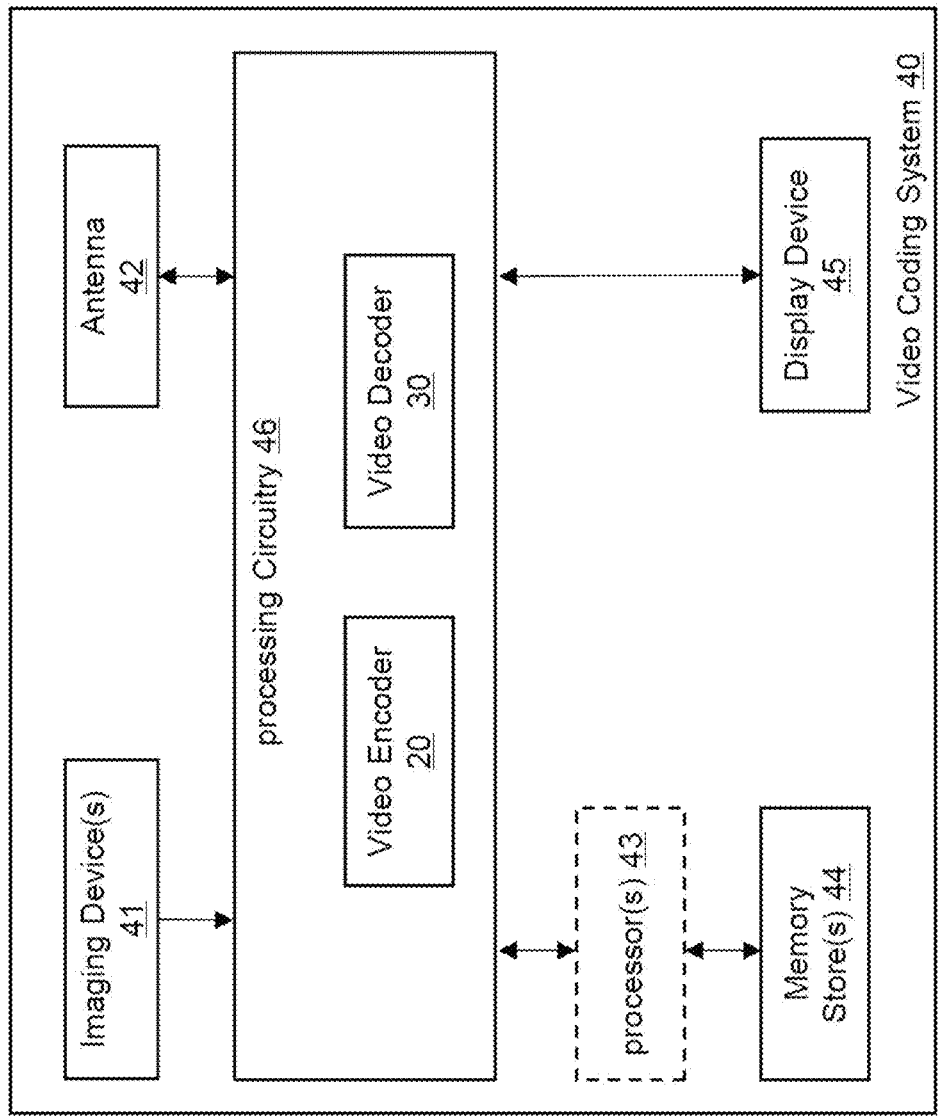
FIG. 1B is a block diagram showing another example of a video coding system configured to implement embodiments of the disclosure.

The encoder 20 (e.g. a video encoder 20) or the decoder 30 (e.g. a video decoder 30) or both, encoder 20 and decoder 30 may be implemented via processing circuitry as shown in FIG. 1B, such as one or more microprocessors, digital signal processors (DSPs), application-specific integrated circuits (ASICs), field-programmable gate arrays (FPGAs), discrete logic, hardware, video coding dedicated or any combinations thereof. The encoder 20 may be implemented via processing circuitry 46 to embody the various modules as discussed with respect to encoder 20 of FIG. 2 and/or any other encoder system or subsystem described herein. The decoder 30 may be implemented via processing circuitry 46 to embody the various modules as discussed with respect to decoder 30 of FIG. 3 and/or any other decoder system or subsystem described herein. The processing circuitry may be configured to perform the various operations as discussed later. As shown in FIG. 5, if the techniques are implemented partially in software, a device may store instructions for the software in a suitable, non-transitory computer-readable storage medium and may execute the instructions in hardware using one or more processors to perform the techniques of this disclosure. Video encoder 20 and video decoder 30 may be integrated as part of a combined encoder/decoder (CODEC) in a single device, for example, as shown in FIG. 1B.

The video coding system 40 shown in FIG. 1B comprises a processing circuitry implementing both a video encoder 20 and a video decoder 30. In addition, one or more imaging devices 41, such as a camera for capturing real-world pictures, an antenna 42, one or more memory stores 44, one or more processors 43 and/or a display device 45, such as the display device 34 described above, may be provided as part of the video coding system 40.

Source device 12 and destination device 14 may comprise any of a wide range of devices, including any kind of handheld or stationary devices, e.g. notebook or laptop computers, mobile phones, smart phones, tablets or tablet computers, cameras, desktop computers, set-top boxes, televisions, display devices, digital media players, video gaming consoles, video streaming devices (such as content services servers or content delivery servers), broadcast receiver devices, broadcast transmitter devices, or the like and may use no or any kind of operating system. In some cases, the source device 12 and the destination device 14 may be equipped for wireless communication. Thus, the source device 12 and the destination device 14 may be wireless communication devices.

In some cases, video coding system 10 illustrated in FIG. 1A is merely an example and the techniques of the present application may apply to video coding systems (e.g., video encoding or video decoding) that do not necessarily include any data communication between the encoding and decoding devices. In other examples, data is retrieved from a local memory, streamed over a network, or the like. A video encoding device may encode and store data in memory, and/or a video decoding device may retrieve and decode data from memory. In some examples, the encoding and decoding is performed by devices that do not communicate with one another, but simply encode data to memory and/or retrieve and decode data from memory.

For convenience of description, embodiments of the disclosure are described herein, for example, by reference to High-Efficiency Video Coding (HEVC) or to the reference software of Versatile Video coding (VVC), the next generation video coding standard developed by the Joint Collaboration Team on Video Coding (JCT-VC) of ITU-T Video Coding Experts Group (VCEG) and ISO/IEC Motion Picture Experts Group (MPEG). One of ordinary skill in the art will understand that embodiments of the disclosure are not limited to HEVC or VVC.

Encoder and Encoding Method

Figure 2:
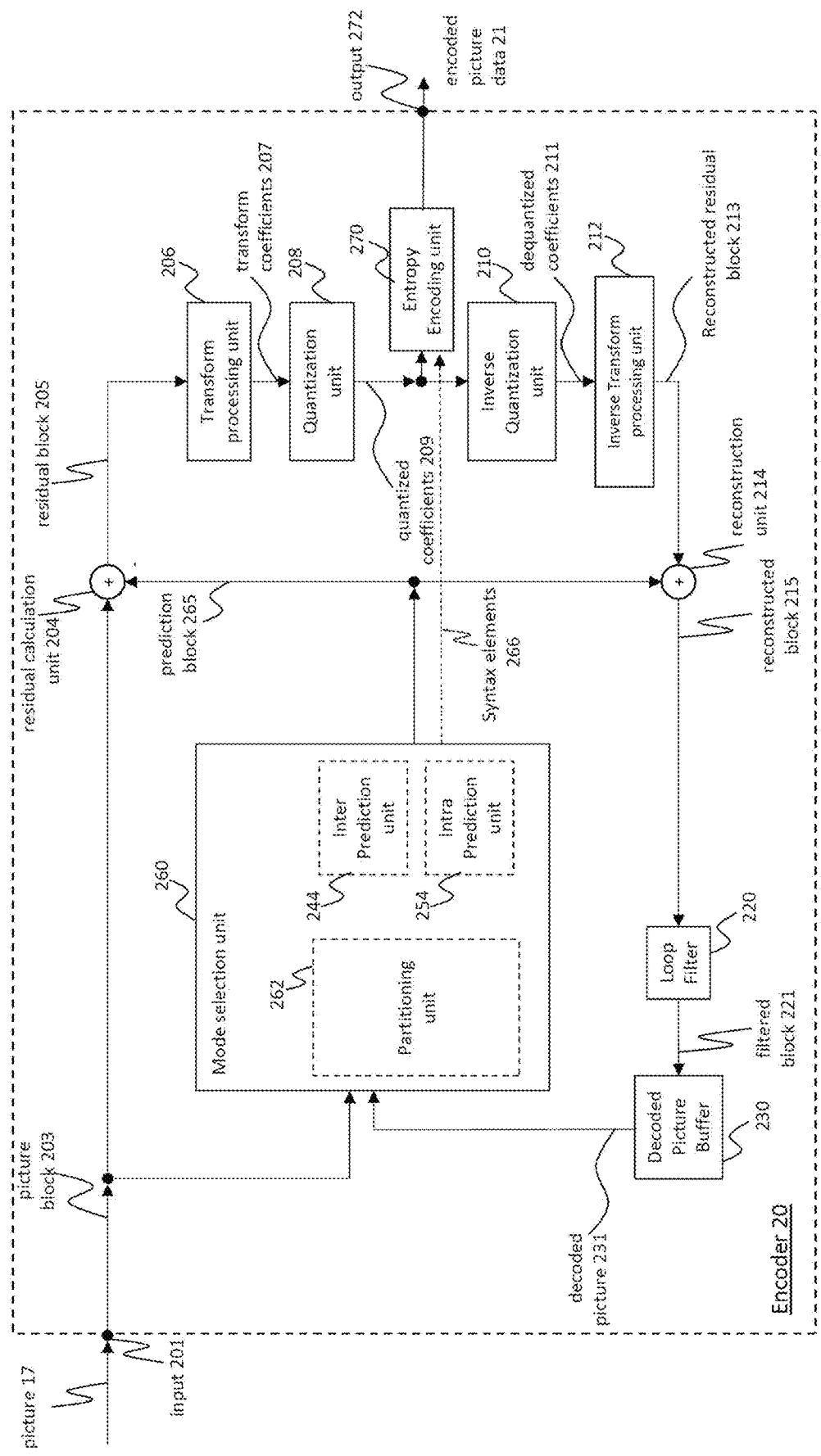
FIG. 2 is a block diagram showing an example of a video encoder configured to implement embodiments of the disclosure.

FIG. 2 shows a schematic block diagram of an example video encoder 20 that is configured to implement the techniques of the present application. In the example of FIG. 2, the video encoder 20 comprises an input 201 (or input interface 201), a residual calculation unit 204, a transform processing unit 206, a quantization unit 208, an inverse quantization unit 210, and an inverse transform processing unit 212, a reconstruction unit 214, a loop filter unit 220, a decoded picture buffer (DPB) 230, a mode selection unit 260, an entropy encoding unit 270 and an output 272 (or output interface 272). The mode selection unit 260 may include an inter prediction unit 244, an intra prediction unit 254 and a partitioning unit 262. The inter prediction unit 244 may include a motion estimation unit and a motion compensation unit (not shown). A video encoder 20 as shown in FIG. 2 may also be referred to as a hybrid video encoder or a video encoder according to a hybrid video codec.

Figure 3:
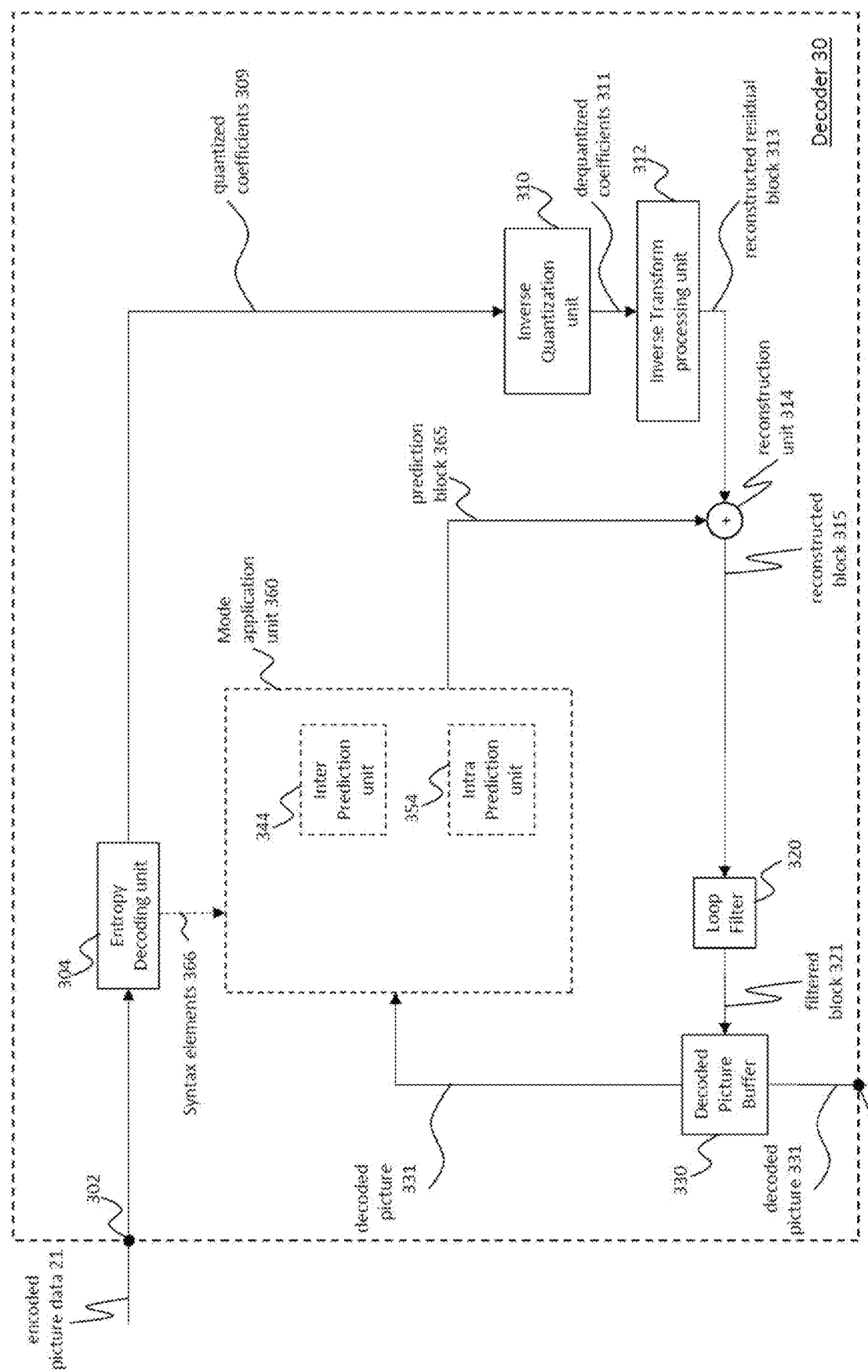
FIG. 3 is a block diagram showing an example structure of a video decoder configured to implement embodiments of the disclosure.

The residual calculation unit 204, the transform processing unit 206, the quantization unit 208, and the mode selection unit 260 may be referred to as forming a forward signal path of the encoder 20, whereas the inverse quantization unit 210, the inverse transform processing unit 212, the reconstruction unit 214, the loop filter 220, the decoded picture buffer (DPB) 230, the inter prediction unit 244 and the intra-prediction unit 254 may be referred to as forming a backward signal path of the video encoder 20, wherein the backward signal path of the video encoder 20 corresponds to the signal path of the decoder (see video decoder 30 in FIG. 3). The inverse quantization unit 210, the inverse transform processing unit 212, the reconstruction unit 214, the loop filter 220, the decoded picture buffer (DPB) 230, the inter prediction unit 244 and the intra-prediction unit 254 are also referred to forming the "built-in decoder" of video encoder 20.

Pictures & Picture Partitioning (Pictures & Blocks)

The encoder 20 may be configured to receive, e.g. via input 201, a picture 17 (or picture data 17), e.g. a picture of a sequence of pictures forming a video or video sequence. The received picture or picture data may also be a pre-processed picture 19 (or pre-processed picture data 19). For the sake of simplicity the following description refers to the picture 17. The picture 17 may also be referred to as a current picture or a picture to be coded (in particular, in video coding to distinguish the current picture from other pictures, e.g. previously encoded and/or decoded pictures of the same video sequence, i.e. the video sequence which also comprises the current picture).

A (digital) picture is or can be regarded as a two-dimensional array or matrix of samples with intensity values. A sample in the array may also be referred to as pixel (short form of picture element) or a pel. The number of samples in the horizontal and vertical direction (or axis) of the array or picture defines the size and/or resolution of the picture. For representation of color, typically three color components are employed, i.e. the picture may be represented as or include three sample arrays. In RBG format or color space, a picture comprises a corresponding red, green and blue sample array. However, in video coding each pixel is typically represented in a luminance and chrominance format or color space, e.g. YCbCr, which comprises a luminance component indicated by Y (sometimes also L is used instead) and two chrominance components indicated by Cb and Cr. The luminance (or short luma) component Y represents the brightness or grey level intensity (e.g. like in a grey-scale picture), while the two chrominance (or short chroma) components Cb and Cr represent the chromaticity or color information components. Accordingly, a picture in YCbCr format comprises a luminance sample array of luminance sample values (Y), and two chrominance sample arrays of chrominance values (Cb and Cr). Pictures in RGB format may be converted or transformed into YCbCr format and vice versa. The process is also known as color transformation or conversion. If a picture is monochrome, the picture may comprise only a luminance sample array. Accordingly, a picture may be, for example, an array of luma samples in monochrome format or an array of luma samples and two corresponding arrays of chroma samples in 4:2:0, 4:2:2, and 4:4:4 colour format.

Embodiments of the video encoder 20 may comprise a picture partitioning unit (not depicted in FIG. 2) configured to partition the picture 17 into a plurality of (typically non-overlapping) picture blocks 203. These blocks may also be referred to as root blocks, macro blocks (H.264/AVC) or coding tree blocks (CTB) or coding tree units (CTU) (according to H.265/HEVC and VVC). The picture partitioning unit may be configured to use the same block size for all pictures of a video sequence and the corresponding grid defining the block size, or to change the block size between pictures or subsets or groups of pictures, and partition each picture into the corresponding blocks.

In further embodiments, the video encoder may be configured to receive directly a block 203 of the picture 17, e.g. one, several or all blocks forming the picture 17. The picture block 203 may also be referred to as current picture block or picture block to be coded.

Like the picture 17, the picture block 203 is or can be regarded as a two-dimensional array or matrix of samples with intensity values (sample values), although of smaller dimension than the picture 17. In other words, the block 203 may comprise, e.g., one sample array (e.g. a luma array in case of a monochrome picture 17, or a luma or chroma array in case of a color picture) or three sample arrays (e.g. a luma and two chroma arrays in case of a color picture 17) or any other number and/or kind of arrays depending on the color format applied. The number of samples in the horizontal and vertical direction (or axis) of the block 203 defines the size of the block 203. Accordingly, a block may, for example, comprise an M×N (M-column by N-row) array of samples, or an M×N array of transform coefficients.

Embodiments of the video encoder 20 as shown in FIG. 2 may be configured to encode the picture 17 block by block, e.g. the encoding and prediction is performed per block 203.

Embodiments of the video encoder 20 as shown in FIG. 2 may be further configured to partition and/or encode the picture by using slices (also referred to as video slices), wherein a picture may be partitioned into or encoded using one or more slices (typically non-overlapping), and each slice may comprise one or more blocks (e.g. CTUs). A slice may contain a collection of rectangular tiles or can be a collection of raster order CTU rows within a tile.

Embodiments of the video encoder 20 as shown in FIG. 2 may be further configured to partition and/or encode the picture by using tile groups (also referred to as video tile groups) and/or tiles (also referred to as video tiles), wherein a picture may be partitioned into or encoded using one or more tile groups (typically non-overlapping), and each tile group may comprise one or more blocks (e.g. CTUs) or one or more tiles, wherein each tile may be of rectangular shape and may comprise one or more blocks (e.g. CTUs), e.g. complete or fractional blocks.

Residual Calculation

The residual calculation unit 204 may be configured to calculate a residual block 205 (also referred to as residual 205) based on the picture block 203 and a prediction block 265 (further details about the prediction block 265 are provided later), e.g. by subtracting sample values of the prediction block 265 from sample values of the picture block 203, sample by sample (pixel by pixel) to obtain the residual block 205 in the sample domain.

Transform

The transform processing unit 206 may be configured to apply a transform, such as a discrete cosine transform (DCT) or discrete sine transform (DST), on the sample values of the residual block 205 to obtain transform coefficients 207 in a transform domain. The transform coefficients 207 may also be referred to as transform residual coefficients and represent the residual block 205 in the transform domain.

The transform processing unit 206 may be configured to apply integer approximations of DCT/DST, such as the transforms specified for H.265/HEVC. Compared to an orthogonal DCT transform, such integer approximations are typically scaled by a certain factor. In order to preserve the norm of the residual block which is processed by forward and inverse transforms, additional scaling factors are applied as part of the transform process. The scaling factors are typically chosen based on certain constraints like scaling factors being a power of two for shift operations, bit depth of the transform coefficients, tradeoff between accuracy and implementation costs, etc. Scaling factors are, for example, specified for the inverse transform, e.g. by inverse transform processing unit 212 (and the corresponding inverse transform, e.g. by inverse transform processing unit 312 at video decoder 30) and corresponding scaling factors for the forward transform, e.g. by transform processing unit 206, at an encoder 20 may be specified accordingly.

Embodiments of the video encoder 20 (respectively, the transform processing unit 206) may be configured to output transform parameters, e.g. a type of transform or transforms, e.g. directly or encoded or compressed via the entropy encoding unit 270, so that, e.g., the video decoder 30 may receive and use the transform parameters for decoding.

Quantization

The quantization unit 208 may be configured to quantize the transform coefficients 207 to obtain quantized coefficients 209, e.g. by applying scalar quantization or vector quantization. The quantized coefficients 209 may also be referred to as quantized transform coefficients 209 or quantized residual coefficients 209.

The quantization process may reduce the bit depth associated with some or all of the transform coefficients 207. For example, an n-bit transform coefficient may be rounded down to an m-bit transform coefficient during quantization, where n is greater than m. The degree of quantization may be modified by adjusting a quantization parameter (QP). For example for scalar quantization, different scalings may be applied to achieve finer or coarser quantization. Smaller quantization step sizes correspond to finer quantization, whereas larger quantization step sizes correspond to coarser quantization. The applicable quantization step size may be indicated by a quantization parameter (QP). The quantization parameter may, for example, be an index of a predefined set of applicable quantization step sizes. For example, small quantization parameters may correspond to fine quantization (small quantization step sizes) and large quantization parameters may correspond to coarse quantization (large quantization step sizes) or vice versa. The quantization may include division by a quantization step size and a corresponding and/or the inverse dequantization, e.g. by inverse quantization unit 210, may include multiplication by the quantization step size. Embodiments according to some standards, e.g. HEVC, may be configured to use a quantization parameter to determine the quantization step size. Generally, the quantization step size may be calculated based on a quantization parameter using a fixed point approximation of an equation including division. Additional scaling factors may be introduced for quantization and dequantization to restore the norm of the residual block, which might get modified because of the scaling used in the fixed point approximation of the equation for quantization step size and quantization parameter. In one embodiment, the scaling of the inverse transform and dequantization might be combined. Alternatively, customized quantization tables may be used and signaled from an encoder to a decoder, e.g. in a bitstream. The quantization is a lossy operation, wherein the loss increases with increasing quantization step sizes.

Embodiments of the video encoder 20 (respectively, the quantization unit 208) may be configured to output quantization parameters (QPs), e.g. directly or encoded via the entropy encoding unit 270, so that, e.g., the video decoder 30 may receive and apply the quantization parameters for decoding.

Inverse Quantization

The inverse quantization unit 210 is configured to apply the inverse quantization of the quantization unit 208 on the quantized coefficients to obtain dequantized coefficients 211, e.g. by applying the inverse of the quantization scheme applied by the quantization unit 208 based on or using the same quantization step size as the quantization unit 208. The dequantized coefficients 211 may also be referred to as dequantized residual coefficients 211 and correspond—although typically not identical to the transform coefficients due to the loss by quantization—to the transform coefficients 207.

Inverse Transform

The inverse transform processing unit 212 is configured to apply the inverse transform of the transform applied by the transform processing unit 206, e.g. an inverse discrete cosine transform (DCT) or inverse discrete sine transform (DST) or other inverse transforms, to obtain a reconstructed residual block 213 (or corresponding dequantized coefficients 213) in the sample domain. The reconstructed residual block 213 may also be referred to as a transform block 213.

Reconstruction

The reconstruction unit 214 (e.g. adder or summer 214) is configured to add the transform block 213 (i.e. reconstructed residual block 213) to the prediction block 265 to obtain a reconstructed block 215 in the sample domain, e.g. by adding—sample by sample—the sample values of the reconstructed residual block 213 and the sample values of the prediction block 265.

Filtering

The loop filter unit 220 (or short "loop filter" 220), is configured to filter the reconstructed block 215 to obtain a filtered block 221, or in general, to filter reconstructed samples to obtain filtered samples. The loop filter unit may be configured to smooth pixel transitions, or otherwise improve the video quality. The loop filter unit 220 may comprise one or more loop filters such as a de-blocking filter, a sample-adaptive offset (SAO) filter or one or more other filters, such as a bilateral filter, an adaptive loop filter (ALF), a sharpening, a smoothing filter or a collaborative filter, or any combination thereof. Although the loop filter unit 220 is shown in FIG. 2 as being an in-loop filter, in other configurations, the loop filter unit 220 may be implemented as a post loop filter. The filtered block 221 may also be referred to as a filtered reconstructed block 221.

Embodiments of the video encoder 20 (respectively, the loop filter unit 220) may be configured to output loop filter parameters (such as sample adaptive offset information), e.g. directly or encoded via the entropy encoding unit 270, so that, e.g., a decoder 30 may receive and apply the same loop filter parameters or respective loop filters for decoding.

Decoded Picture Buffer

The decoded picture buffer (DPB) 230 may be a memory that stores reference pictures, or in general reference picture data, for encoding video data by video encoder 20. The DPB 230 may be formed by any of a variety of memory devices, such as dynamic random access memory (DRAM), including synchronous DRAM (SDRAM), magnetoresistive RAM (MRAM), resistive RAM (RRAM), or other types of memory devices. The decoded picture buffer (DPB) 230 may be configured to store one or more filtered blocks 221. The decoded picture buffer 230 may be further configured to store other previously filtered blocks, e.g. previously reconstructed and filtered blocks 221, of the same current picture or of different pictures, e.g. previously reconstructed pictures, and may provide complete previously reconstructed, i.e. decoded, pictures (and corresponding reference blocks and samples) and/or a partially reconstructed current picture (and corresponding reference blocks and samples), for example for inter prediction. The decoded picture buffer (DPB) 230 may also be configured to store one or more unfiltered reconstructed blocks 215, or in general unfiltered reconstructed samples, e.g. if the reconstructed block 215 is not filtered by loop filter unit 220, or any other further processed version of the reconstructed blocks or samples.

Mode Selection (Partitioning & Prediction)

The mode selection unit 260 comprises partitioning unit 262, inter-prediction unit 244 and intra-prediction unit 254, and is configured to receive or obtain original picture data, such as an original block 203 (current block 203 of the current picture 17), and reconstructed picture data, such as filtered and/or unfiltered reconstructed samples or blocks of the same (current) picture and/or from one or a plurality of previously decoded pictures, e.g. from decoded picture buffer 230 or other buffers (e.g. line buffer, not shown). The reconstructed picture data is used as reference picture data for prediction, e.g. inter-prediction or intra-prediction, to obtain a prediction block 265 or predictor 265.

Mode selection unit 260 may be configured to determine or select a partitioning for a current block prediction mode (including no partitioning) and a prediction mode (e.g. an intra- or inter-prediction mode) and generate a corresponding prediction block 265, which is used for the calculation of the residual block 205 and for the reconstruction of the reconstructed block 215.

Embodiments of the mode selection unit 260 may be configured to select the partitioning and the prediction mode (e.g. from those supported by or available for mode selection unit 260), which provide the best match or in other words the minimum residual (minimum residual means better compression for transmission or storage), or a minimum signaling overhead (minimum signaling overhead means better compression for transmission or storage), or which considers or balances both. The mode selection unit 260 may be configured to determine the partitioning and prediction mode based on rate distortion optimization (RDO), i.e. select the prediction mode which provides a minimum rate distortion. Terms like "best", "minimum", "optimum" etc. in this context do not necessarily refer to an overall "best", "minimum", "optimum", etc. but may also refer to the fulfillment of a termination or selection criterion like a value exceeding or falling below a threshold or other constraints leading potentially to a "sub-optimum selection" but reducing complexity and processing time.

In other words, the partitioning unit 262 may be configured to partition the block 203 into smaller block partitions or sub-blocks (which again form blocks), e.g. iteratively using quad-tree-partitioning (QT), binary-tree partitioning (BT) or triple-tree-partitioning (TT) or any combination thereof, and to perform the prediction for each of the block partitions or sub-blocks, wherein the mode selection comprises the selection of the tree-structure of the partitioned block 203 and the prediction modes are applied to each of the block partitions or sub-blocks.

In the following, the partitioning (e.g. by partitioning unit 262) and prediction processing (by inter-prediction unit 244 and intra-prediction unit 254) performed by an example video encoder 20 will be explained in more detail.

Partitioning

The partitioning unit 262 may partition (or split) a current block 203 into smaller partitions, e.g. smaller blocks of square or rectangular size. These smaller blocks (which may also be referred to as sub-blocks) may be further partitioned into even smaller partitions. This is also referred to as tree-partitioning or hierarchical tree-partitioning, wherein a root block, e.g. at root tree-level 0 (hierarchy-level 0, depth 0), may be recursively partitioned, e.g. partitioned into two or more blocks of a next lower tree-level, e.g. nodes at tree-level 1 (hierarchy-level 1, depth 1), wherein these blocks may be again partitioned into two or more blocks of a next lower level, e.g. tree-level 2 (hierarchy-level 2, depth 2), etc. until the partitioning is terminated, e.g. because a termination criterion is fulfilled, e.g. a maximum tree depth or minimum block size is reached. Blocks which are not further partitioned are also referred to as leaf-blocks or leaf nodes of the tree. A tree using partitioning into two partitions is referred to as a binary-tree (BT), a tree using partitioning into three partitions is referred to as a ternary-tree (TT), and a tree using partitioning into four partitions is referred to as a quad-tree (QT).

As mentioned before, the term "block" as used herein may be a portion, in particular a square or rectangular portion, of a picture. With reference, for example, to HEVC and VVC, the block may be or correspond to a coding tree unit (CTU), a coding unit (CU), a prediction unit (PU), or a transform unit (TU) and/or to the corresponding blocks, e.g. a coding tree block (CTB), a coding block (CB), a transform block (TB) or a prediction block (PB).

For example, a coding tree unit (CTU) may be or comprise a CTB of luma samples and two corresponding CTBs of chroma samples of a picture that has three sample arrays, or a CTB of samples of a monochrome picture or a picture that is coded using three separate colour planes and syntax structures used to code the samples. Correspondingly, a coding tree block (CTB) may be an N×N block of samples for some value of N such that the division of a component into CTBs is a partitioning. A coding unit (CU) may be or comprise a coding block of luma samples and two corresponding coding blocks of chroma samples of a picture that has three sample arrays, or a coding block of samples of a monochrome picture or a picture that is coded using three separate colour planes and syntax structures used to code the samples. Correspondingly, a coding block (CB) may be an M×N block of samples for some values of M and N such that the division of a CTB into coding blocks is a partitioning.

In some embodiments, e.g., according to HEVC, a coding tree unit (CTU) may be split into CUs by using a quad-tree structure denoted as a coding tree. The decision whether to code a picture area using inter-picture (temporal) or intra-picture (spatial) prediction is made at the CU level. Each CU can be further split into one, two or four PUs according to the PU splitting type. Inside one PU, the same prediction process is applied and the relevant information is transmitted to the decoder on a PU basis. After obtaining the residual block by applying the prediction process based on the PU splitting type, a CU can be partitioned into transform units (TUs) according to another quad-tree structure similar to the coding tree for the CU.

In embodiments, e.g., according to the latest video coding standard currently in development, which is referred to as Versatile Video Coding (VVC), a combined quad-tree and binary-tree (QTBT) partitioning is for example used to partition a coding block. In the QTBT block structure, a CU can have either a square or rectangular shape. For example, a coding tree unit (CTU) is first partitioned by a quad-tree structure. The quad-tree leaf nodes are further partitioned by a binary-tree or ternary (or triple)-tree structure. The partitioning tree leaf nodes are called coding units (CUs), and that partition is used for prediction and transform processing without any further partitioning. This means that the CU, PU and TU have the same block size in the QTBT coding block structure. In parallel, multiple partitions, for example, triple-tree partition may be used together with the QTBT block structure.

In one example, the mode selection unit 260 of video encoder 20 may be configured to perform any combination of the partitioning techniques described herein.

As described above, the video encoder 20 is configured to determine or select the best or an optimum prediction mode from a set of (e.g. pre-determined) prediction modes. The set of prediction modes may comprise intra-prediction modes and/or inter-prediction modes.

Intra-Prediction

The set of intra-prediction modes may comprise 35 different intra-prediction modes, such as non-directional modes like DC (or mean) mode and planar mode, or directional modes, e.g. as defined in HEVC, or may comprise 67 different intra-prediction modes, such as non-directional modes like DC (or mean) mode and planar mode, or directional modes, e.g. as defined for VVC.

The intra-prediction unit 254 is configured to use reconstructed samples of neighboring blocks of the same current picture to generate an (intra-)prediction block 265 according to an intra-prediction mode from the set of intra-prediction modes.

The intra-prediction unit 254 (or in general the mode selection unit 260) may be further configured to output intra-prediction parameters (or in general information indicative of the selected intra-prediction mode for the block) to the entropy encoding unit 270 in the form of syntax elements 266 for inclusion into the encoded picture data 21, so that, e.g., the video decoder 30 may receive and use the prediction parameters for decoding.

Inter-Prediction

The set of (or possible) inter-prediction modes depends on the available reference pictures (i.e. previous, at least partially decoded pictures, e.g. stored in DBP 230) and other inter-prediction parameters, e.g. whether the whole reference picture or only a part, e.g. a search window area around the area of the current block, of the reference picture is used for searching for a best matching reference block, and/or e.g. whether pixel interpolation is applied, such as half/semi-pel and/or quarter-pel interpolation, or not.

In addition to the above prediction modes, skip mode and/or direct mode may be applied.

The inter-prediction unit 244 may include a motion estimation (ME) unit and a motion compensation (MC) unit (both not shown in FIG. 2). The motion estimation unit may be configured to receive or obtain the picture block 203 (current picture block 203 of the current picture 17) and a decoded picture 231, or at least one or a plurality of previously reconstructed blocks, such as reconstructed blocks of one or a plurality of previously decoded pictures 231, for motion estimation. By way of example, a video sequence may comprise the current picture and the previously decoded pictures 231, or in other words, the current picture and the previously decoded pictures 231 may be part of or form a sequence of pictures forming a video sequence.

The encoder 20 may be configured to select a reference block from a plurality of reference blocks of the same or different pictures of the plurality of previously decoded pictures and provide a reference picture (or reference picture index) and/or an offset (spatial offset) between the position (x, y coordinates) of the reference block and the position of the current block as inter-prediction parameters to the motion estimation unit. This offset is also called motion vector (MV). In some embodiments, the MV can be further refined on both the encoding side and the decoding side to improve the prediction accuracy and ultimately improve the compression performance. Besides, the prediction obtained by the MV or the refined MV can be further modified or adjusted by using Bi-predictive optical flow refinement (BPOF) by which the prediction can be compensated in a case where a fine motion exists on the pixel level. The technology of decoding side motion vector refinement (DMVR) and (BPOF) will be detailed later.

The motion compensation unit may be configured to obtain, e.g. receive, an inter-prediction parameter and to perform inter-prediction based on or using the inter-prediction parameter to obtain an (inter-)prediction block 265. Motion compensation, performed by the motion compensation unit, may involve fetching or generating the prediction block based on the motion/block vector determined by motion estimation, possibly performing interpolations to sub-pixel precision. Interpolation filtering may generate additional pixel samples from known pixel samples, thus potentially increasing the number of candidate prediction blocks that may be used to code a picture block. Upon receiving the motion vector for the PU of the current picture block, the motion compensation unit may locate the prediction block to which the motion vector points in one of the reference picture lists.

The motion compensation unit may also generate syntax elements associated with the blocks and video slices for use by video decoder 30 in decoding the picture blocks of the video slice. In addition or as an alternative to slices and respective syntax elements, tile groups and/or tiles and respective syntax elements may be generated or used.

Entropy Coding

The entropy encoding unit 270 is configured to apply, for example, an entropy encoding algorithm or scheme (e.g. a variable length coding (VLC) scheme, a context adaptive VLC scheme (CAVLC), an arithmetic coding scheme, a binarization, a context adaptive binary arithmetic coding (CABAC), syntax-based context-adaptive binary arithmetic coding (SBAC), probability interval partitioning entropy (PIPE) coding or another entropy encoding methodology or technique) or bypass (no compression) on the quantized coefficients 209, inter-prediction parameters, intra-prediction parameters, loop filter parameters and/or other syntax elements to obtain encoded picture data 21 which can be output via the output 272, e.g. in the form of an encoded bitstream 21, so that, e.g., the video decoder 30 may receive and use the parameters for decoding. The encoded bitstream 21 may be transmitted to video decoder 30, or stored in a memory for later transmission or retrieval by video decoder 30.

Other structural variations of the video encoder 20 can be used to encode the video stream. For example, a non-transform based encoder 20 can quantize the residual signal directly without the transform processing unit 206 for certain blocks or frames. In another embodiment, an encoder 20 can have the quantization unit 208 and the inverse quantization unit 210 combined into a single unit.

Decoder and Decoding Method

FIG. 3 shows an example of a video decoder 30 that is configured to implement the techniques of the present application. The video decoder 30 is configured to receive encoded picture data 21 (e.g. encoded bitstream 21), e.g. encoded by encoder 20, to obtain a decoded picture 331. The encoded picture data or bitstream comprises information for decoding the encoded picture data, e.g. data that represents picture blocks of an encoded video slice (and/or tile group or tile) and associated syntax elements.

In the example of FIG. 3, the decoder 30 comprises an entropy decoding unit 304, an inverse quantization unit 310, an inverse transform processing unit 312, a reconstruction unit 314 (e.g. a summer 314), a loop filter 320, a decoded picture buffer (DBP) 330, a mode application unit 360, an inter-prediction unit 344 and an intra-prediction unit 354. Inter-prediction unit 344 may be or include a motion compensation unit. Video decoder 30 may, in some examples, perform a decoding pass generally reciprocal to the encoding pass described with respect to video encoder 20 of FIG. 2.

As explained with regard to the encoder 20, the inverse quantization unit 210, the inverse transform processing unit 212, the reconstruction unit 214, the loop filter 220, the decoded picture buffer (DPB) 230, the inter-prediction unit 244 and the intra-prediction unit 254 are also referred to as forming the "built-in decoder" of video encoder 20. Accordingly, the inverse quantization unit 310 may be identical in function to the inverse quantization unit 210, the inverse transform processing unit 312 may be identical in function to the inverse transform processing unit 212, the reconstruction unit 314 may be identical in function to reconstruction unit 214, the loop filter 320 may be identical in function to the loop filter 220, and the decoded picture buffer 330 may be identical in function to the decoded picture buffer 230. Therefore, the explanations provided for the respective units and functions of the video 20 encoder apply correspondingly to the respective units and functions of the video decoder 30.

Entropy Decoding

The entropy decoding unit 304 is configured to parse the bitstream 21 (or in general encoded picture data 21) and perform, for example, entropy decoding to the encoded picture data 21 to obtain, e.g., quantized coefficients 309 and/or decoded coding parameters 366, such as any or all of inter-prediction parameters (e.g. reference picture index and motion vector), intra-prediction parameters (e.g. intra-prediction mode or index), transform parameters, quantization parameters, loop filter parameters, and/or other syntax elements. Entropy decoding unit 304 may be configured to apply the decoding algorithms or schemes corresponding to the encoding schemes as described with regard to the entropy encoding unit 270 of the encoder 20. Entropy decoding unit 304 may be further configured to provide inter-prediction parameters, intra-prediction parameters and/or other syntax elements to the mode application unit 360 and other parameters to other units of the decoder 30. Video decoder 30 may receive the syntax elements at the video slice level and/or the video block level. In addition or as an alternative to slices and respective syntax elements, tile groups and/or tiles and respective syntax elements may be received and/or used.

Inverse Quantization

The inverse quantization unit 310 may be configured to receive quantization parameters (QP) (or in general, information related to the inverse quantization) and quantized coefficients from the encoded picture data 21 (e.g. by parsing and/or decoding, e.g. by entropy decoding unit 304) and to apply, based on the quantization parameters, an inverse quantization to the decoded quantized coefficients 309 to obtain dequantized coefficients 311, which may also be referred to as transform coefficients 311. The inverse quantization process may include use of a quantization parameter determined by video encoder 20 for each video block in the video slice (or tile or tile group) to determine a degree of quantization and, likewise, a degree of inverse quantization that should be applied.

Inverse Transform

Inverse transform processing unit 312 may be configured to receive dequantized coefficients 311, also referred to as transform coefficients 311, and to apply a transform to the dequantized coefficients 311 in order to obtain reconstructed residual blocks 313 in the sample domain. The reconstructed residual blocks 313 may also be referred to as transform blocks 313. The transform may be an inverse transform, e.g., an inverse DCT, an inverse DST, an inverse integer transform, or a conceptually similar inverse transform process. The inverse transform processing unit 312 may be further configured to receive transform parameters or corresponding information from the encoded picture data 21 (e.g. by parsing and/or decoding, e.g. by entropy decoding unit 304) to determine the transform to be applied to the dequantized coefficients 311.

Reconstruction

The reconstruction unit 314 (e.g. adder or summer 314) may be configured to add the reconstructed residual block 313, to the prediction block 365 to obtain a reconstructed block 315 in the sample domain, e.g. by adding the sample values of the reconstructed residual block 313 and the sample values of the prediction block 365.

Filtering

The loop filter unit 320 (either in the coding loop or after the coding loop) is configured to filter the reconstructed block 315 to obtain a filtered block 321, e.g. to smooth pixel transitions, or otherwise improve the video quality. The loop filter unit 320 may comprise one or more loop filters such as a de-blocking filter, a sample-adaptive offset (SAO) filter or one or more other filters, e.g. a bilateral filter, an adaptive loop filter (ALF), a sharpening, a smoothing filter or a collaborative filter, or any combination thereof. Although the loop filter unit 320 is shown in FIG. 3 as being an in-loop filter, in other configurations, the loop filter unit 320 may be implemented as a post loop filter.

Decoded Picture Buffer

The decoded video blocks 321 of a picture are then stored in the decoded picture buffer 330, which stores the decoded pictures 331 as reference pictures for subsequent motion compensation for other pictures and/or for output or respectively display.

The decoder 30 is configured to output the decoded picture 311, e.g. via output 312, for presentation or viewing to a user.

Prediction

The inter-prediction unit 344 may be identical to the inter-prediction unit 244 (in particular, to the motion compensation unit) and the intra-prediction unit 354 may be identical to the intra-prediction unit 254 in function, and performs split or partitioning decisions and prediction based on the partitioning and/or prediction parameters or respective information received from the encoded picture data 21 (e.g. by parsing and/or decoding, e.g. by entropy decoding unit 304). Mode application unit 360 may be configured to perform the prediction (intra- or inter-prediction) per block based on reconstructed pictures, blocks or respective samples (filtered or unfiltered) to obtain the prediction block 365.

When the video slice or picture is coded as an intra-coded (I) slice, intra-prediction unit 354 of mode application unit 360 is configured to generate prediction block 365 for a picture block of the current video slice based on a signaled intra-prediction mode and data from previously decoded blocks of the current picture. When the video slice or picture is coded as an inter-coded (i.e., B, or P) slice, inter-prediction unit 344 (e.g. motion compensation unit) of mode application unit 360 is configured to produce prediction block 365 for a video block of the current video slice based on the motion vectors and other syntax elements received from entropy decoding unit 304. For inter-prediction, the prediction blocks may be produced from one of the reference pictures within one of the reference picture lists. Video decoder 30 may construct the reference picture lists, List 0 and List 1, using default construction techniques based on reference pictures stored in DPB 330. The same or similar approach may be applied for or by embodiments using tile groups (e.g. video tile groups) and/or tiles (e.g. video tiles) in addition or alternatively to slices (e.g. video slices), e.g. a video may be coded using I, P or B tile groups and/or tiles.

Mode application unit 360 is configured to determine the prediction information for a video/picture block of the current video slice by parsing the motion vectors or related information and other syntax elements, and use the prediction information to produce the prediction blocks for the current video block being decoded. For example, the mode application unit 360 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-coded video block of the slice, inter-prediction status for each inter-coded video block of the slice, and other information to decode the video blocks in the current video slice. The same or similar approach may be applied for or by embodiments using tile groups (e.g. video tile groups) and/or tiles (e.g. video tiles) in addition or alternatively to slices (e.g. video slices), e.g. a video may be coded using I, P or B tile groups and/or tiles.

Embodiments of the video decoder 30 as shown in FIG. 3 may be configured to partition and/or decode the picture by using slices (also referred to as video slices), wherein a picture may be partitioned into or decoded using one or more slices (typically non-overlapping), and each slice may comprise one or more blocks (e.g. CTUs).

Embodiments of the video decoder 30 as shown in FIG. 3 may be configured to partition and/or decode the picture by using tile groups (also referred to as video tile groups) and/or tiles (also referred to as video tiles), wherein a picture may be partitioned into or decoded using one or more tile groups (typically non-overlapping), and each tile group may comprise one or more blocks (e.g. CTUs) or one or more tiles, wherein each tile may be of rectangular shape and may comprise one or more blocks (e.g. CTUs), e.g. complete or fractional blocks.

Other variations of the video decoder 30 can be used to decode the encoded picture data 21. For example, the decoder 30 can produce the output video stream without the loop filtering unit 320. For example, a non-transform based decoder 30 can inverse-quantize the residual signal directly without the inverse-transform processing unit 312 for certain blocks or frames. In another embodiment, the video decoder 30 can have the inverse-quantization unit 310 and the inverse-transform processing unit 312 combined into a single unit.

It should be understood that, in the encoder 20 and the decoder 30, a processing result of a current step may be further processed and then output to the next step. For example, after interpolation filtering, motion vector derivation or loop filtering, a further operation, such as Clip or shift, may be performed on the processing result of the interpolation filtering, motion vector derivation or loop filtering.

It should be noted that further operations may be applied to the derived motion vectors of the current block (including but not limited to control point motion vectors of affine mode, sub-block motion vectors in affine, planar, ATMVP modes, temporal motion vectors, and so on). For example, the value of a motion vector is constrained to a predefined range according to its representing bit number. If the representing bit number of the motion vector is bitDepth, then the range is $-2^{\wedge}(\text{bitDepth}-1) \sim 2^{\wedge}(\text{bitDepth}-1)-1$, where "^" means exponentiation. For example, if bitDepth is set equal to 16, the range is $-32768 \sim 32767$; if bitDepth is set equal to 18, the range is $-131072 \sim 131071$. For example, the value of the derived motion vector (e.g. the MVs of four 4×4 sub-blocks within one 8×8 block) is constrained such that the maximum difference between integer parts of the four 4×4 sub-block MVs is no more than N pixels, such as no more than 1 pixel. The following description provides two methods for constraining the motion vector according to the bitDepth.

Method 1: remove the overflow MSB (most significant bit) by the following operations:

$$ux = (mvx + 2^{bitDepth}) \% 2^{bitDepth} \quad (1)$$

$$mvx = (ux >= 2^{bitDepth-1}) ? (ux - 2^{bitDepth}) : ux \quad (2)$$

$$uy = (mvy + 2^{bitDepth}) \% 2^{bitDepth} \quad (3)$$

$$mvy = (uy >= 2^{bitDepth-1}) ? (uy - 2^{bitDepth}) : uy \quad (4)$$

where mvx is a horizontal component of a motion vector of an image block or a sub-block, mvy is a vertical component of a motion vector of an image block or a sub-block, and ux and uy indicate respective intermediate values.

For example, if the value of mvx is $-32769$, after applying formulae (1) and (2), the resulting value is 32767. In a computer system, decimal numbers are stored as two's complements. The two's complement of $-32769$ is 1,0111,1111,1111,1111 (17 bits). Then, the MSB is discarded, so the resulting two's complement is 0111,1111,1111,1111 (decimal number is 32767), which is the same as the output by applying formulae (1) and (2).

$$ux = (mvpx + mvdx + 2^{bitDepth}) \% 2^{bitDepth} \quad (5)$$

$$mvx = (ux >= 2^{bitDepth-1}) ? (ux - 2^{bitDepth}) : ux \quad (6)$$

$$uy = (mvpy + mvdy + 2^{bitDepth}) \% 2^{bitDepth} \quad (7)$$

$$mvy = (uy >= 2^{bitDepth-1}) ? (uy - 2^{bitDepth}) : uy \quad (8)$$

The operations may be applied during the sum of the motion vector predictor mvp and the motion vector difference mvd, as shown in formulae (5) to (8).

Method 2: remove the overflow MSB by clipping the value:

$$vx = \text{Clip3}(-2^{bitDepth-1}, 2^{bitDepth-1} - 1, vx)$$

$$vy = \text{Clip3}(-2^{bitDepth-1}, 2^{bitDepth-1} - 1, vy)$$

where vx is a horizontal component of a motion vector of an image block or a sub-block, vy is a vertical component of a motion vector of an image block or a sub-block; x, y and z respectively correspond to three input values of the MV clipping process, and the definition of the function Clip3 is as follows:

$$\text{Clip3}(x, y, z) = \begin{cases} x; & z < x \\ y; & z > y \\ z; & \text{otherwise} \end{cases}$$

Figure 4:
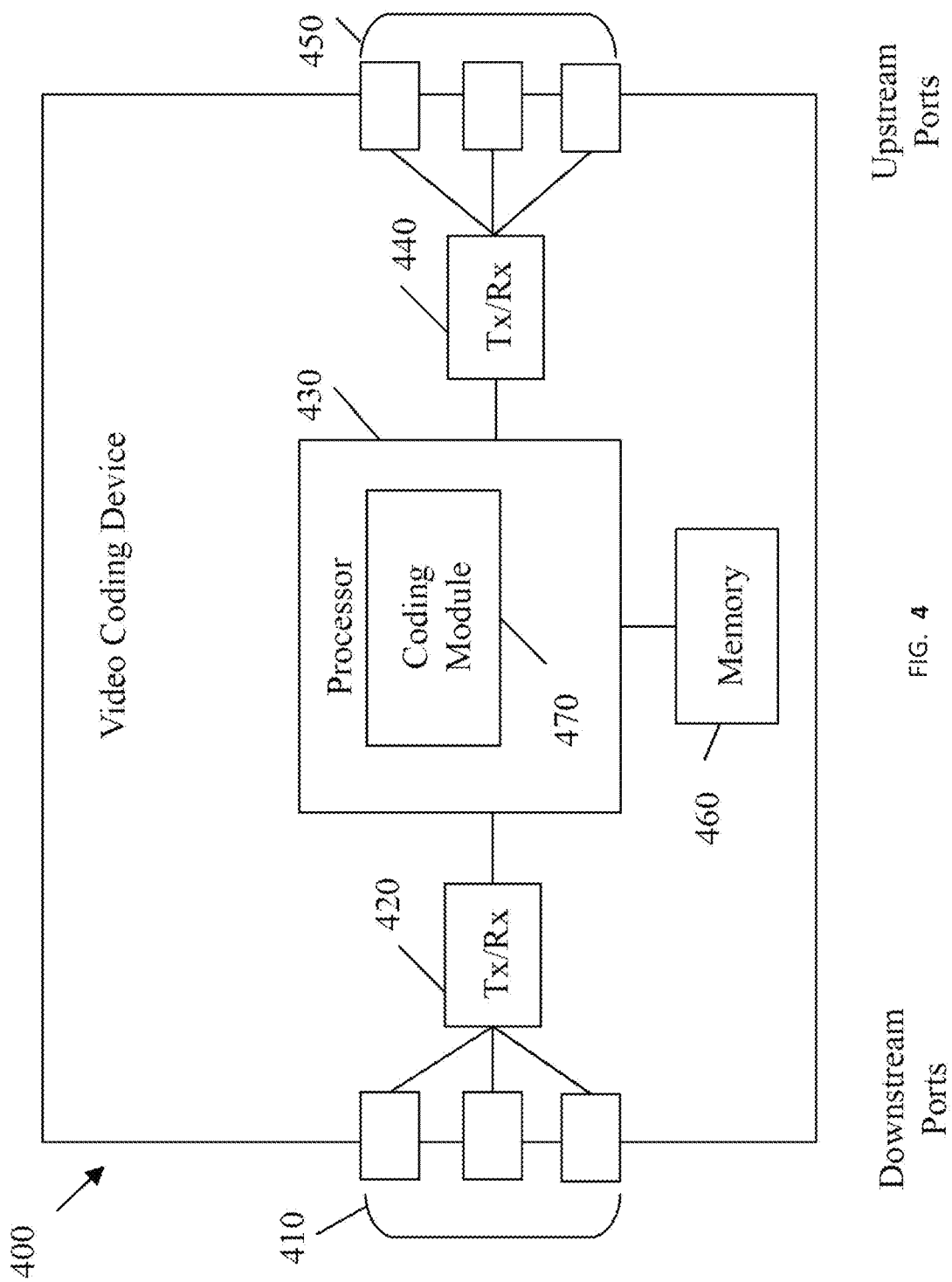
FIG. 4 is a block diagram illustrating an example of an encoding apparatus or a decoding apparatus.

FIG. 4 is a schematic diagram of a video coding device 400 according to an embodiment of the present disclosure. The video coding device 400 is suitable for implementing the disclosed embodiments as described below. In an embodiment, the video coding device 400 may be a decoder such as video decoder 30 of FIG. 1A or an encoder such as video encoder 20 of FIG. 1A.

The video coding device 400 may comprise ingress ports 410 (or input ports 410) and one or more receiver units (Rx) 420 for receiving data; a processor, logic unit, or central processing unit (CPU) 430 to process the data; one or more transmitter units (Tx) 440 and egress ports 450 (or output ports 450) for transmitting the data; and a memory 460 for storing the data. The video coding device 400 may also comprise optical-to-electrical (OE) components and electrical-to-optical (EO) components coupled to the ingress ports 410, the receiver units 420, the transmitter units 440, and the egress ports 450 for egress or ingress of optical or electrical signals.

The processor 430 may be implemented by hardware and software. The processor 430 may be implemented as one or more CPU chips, cores (e.g., as a multi-core processor), FPGAs, ASICs, and DSPs. The processor 430 may be in communication with the ingress ports 410, the receiver units 420, the transmitter units 440, egress ports 450, and the memory 460. The processor 430 may comprise a coding module 470. The coding module 470 implements the disclosed embodiments described above and below. For instance, the coding module 470 may implement, process, prepare, or provide the various coding operations. The inclusion of the coding module 470 therefore provides a substantial improvement to the functionality of the video coding device 400 and effects a transformation of the video coding device 400 to a different state. Alternatively, the coding module 470 may be implemented as instructions stored in the memory 460 and executed by the processor 430.

The memory 460 may comprise one or more disks, tape drives, and solid-state drives and may be used as an overflow data storage device, to store programs when such programs are selected for execution, and to store instructions and data that are read during program execution. The memory 460 may be, for example, volatile and/or non-volatile and may be a read-only memory (ROM), random access memory (RAM), ternary content-addressable memory (TCAM), and/or static random-access memory (SRAM).

Figure 5:
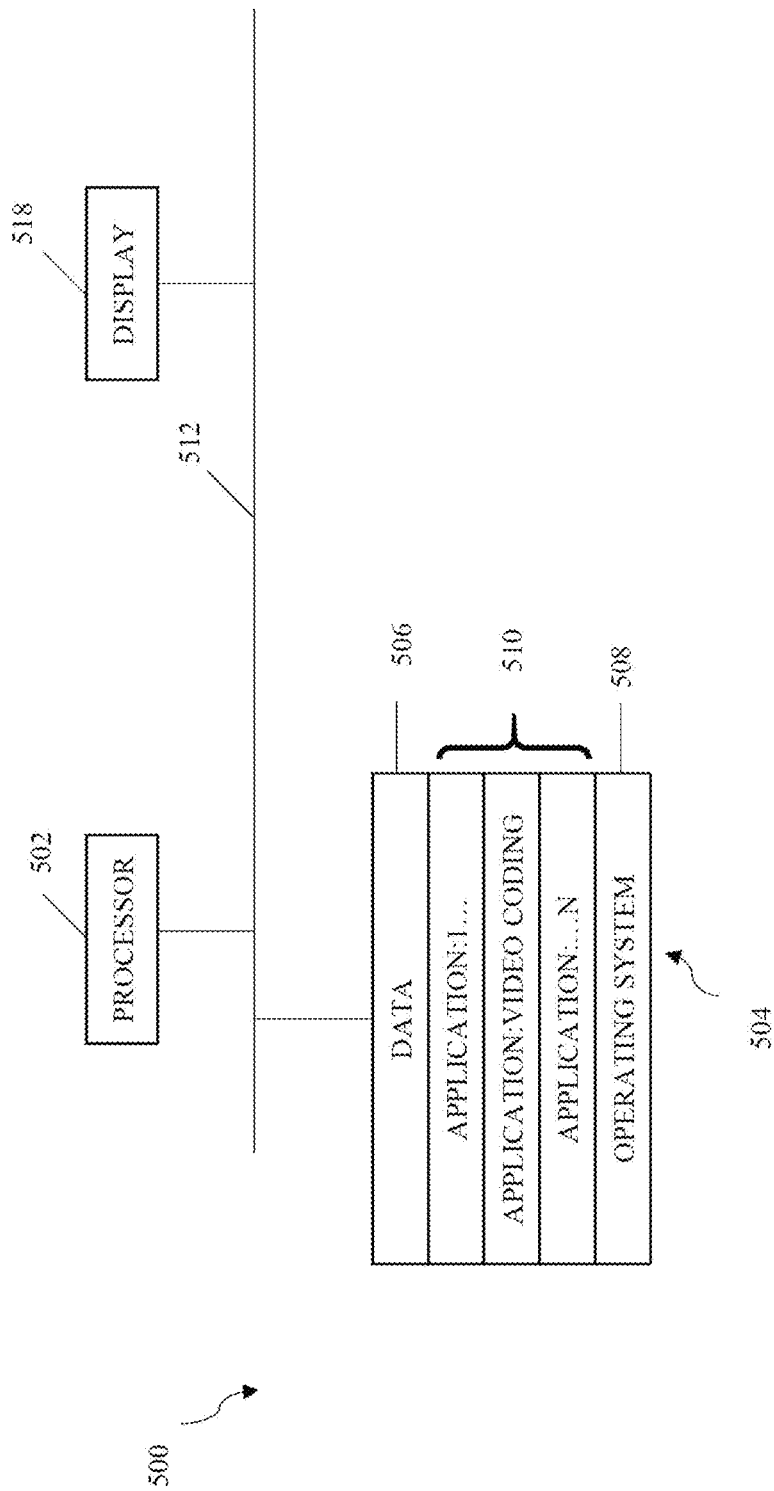
FIG. 5 is a block diagram illustrating another example of an encoding apparatus or a decoding apparatus.

FIG. 5 is a simplified block diagram of an apparatus 500 that may be used as either or both of the source device 12 and the destination device 14 from FIG. 1A according to an exemplary embodiment.

A processor 502 in the apparatus 500 can be a central processing unit. Alternatively, the processor 502 can be any other type of device, or multiple devices, capable of manipulating or processing information now-existing or hereafter developed. Although the disclosed embodiments can be practiced with a single processor as shown, e.g., the processor 502, advantages in speed and efficiency can be achieved using more than one processor.

A memory 504 in the apparatus 500 can be a read only memory (ROM) device or a random access memory (RAM) device in an embodiment. Any other suitable type of storage device can be used as the memory 504. The memory 504 can include code and data 506 that is accessed by the processor 502 using a bus 512. The memory 504 can further include an operating system 508 and application programs 510, the application programs 510 including at least one program that permits the processor 502 to perform the methods described herein. For example, the application programs 510 can include applications 1 through N, which further include a video coding application that performs the methods described herein.

The apparatus 500 can also include one or more output devices, such as a display 518. The display 518 may be, in one example, a touch sensitive display that combines a display with a touch sensitive element that is operable to sense touch inputs. The display 518 can be coupled to the processor 502 via the bus 512.

Although depicted here as a single bus, the bus 512 of the apparatus 500 can be composed of multiple buses. Further, a secondary storage (not shown) can be directly coupled to the other components of the apparatus 500 or can be accessed via a network and can comprise a single integrated unit such as a memory card or multiple units such as multiple memory cards. The apparatus 500 can thus be implemented in a wide variety of configurations.

Motion Vector Refinement (MVR)

Motion vectors are usually at least partially determined at the encoder side and signaled to the decoder within the coded bitstream. However, the motion vectors may also be refined at the decoder (and also at the encoder) starting from initial motion vectors indicated in the bitstream. In such case, for instance, similarity between the patches or blocks of already decoded pixels pointed to by the initial motion vectors may be used to improve the accuracy of the initial motion vectors. Such motion vector refinement provides an advantage of reducing the signaling overhead: the accuracy of the initial motion vector is improved in the same way at both, the encoder and the decoder and thus, no additional signaling for the refinement is needed.

It is noted that the initial motion vectors before refinement might not be the best motion vectors that result in the best prediction. Since the initial motion vectors are signaled in the bitstream, it might not be possible to represent the initial motion vector with very high accuracy (which would increase the bitrate). Therefore, the motion vector refinement process is utilized to improve the initial motion vector. Initial motion vectors might, for instance, be the motion vectors that are used in the prediction of a neighbor block of a current block. In this case, it is enough to signal an indication in the bitstream, indicating motion vectors of which neighbor block are used by the current block. Such a prediction mechanism is very efficient in reducing the number of bits to represent the initial motion vectors. However, the accuracy of the initial motion vectors might be low, since in general the motion vectors of two neighboring blocks are not expected to be identical.

In order to further improve the accuracy of motion vectors without further increase in signaling overhead, it may be beneficial to further refine the motion vectors derived at the encoder side and provided (signaled) in the bitstream. The motion vector refinement may be performed at the decoder without assistance from the encoder. The encoder in its decoder loop may employ the same refinement to obtain corresponding refined motion vectors as would be available at the decoder. The refinement for a current block that is being reconstructed in a current picture is performed by determining a template of reconstructed samples, determining a search space around the initial motion information for the current block and finding, in the search space, a reference picture portion best matching the template. The best matching portion determines the refined motion vectors for the current block which is then used to obtain the inter-predicted samples for the current block, i.e. the current block being reconstructed.

Motion vector refinement is a part of the inter prediction unit 244 in FIGS. 2 and 344 in FIG. 3.

The motion vector refinement may be performed according to the following operations: Typically, an initial motion vector can be determined based on an indication in the bitstream. For example, an index may be signaled in the bitstream which indicates a position in a list of candidate motion vectors. In another example, a motion vector predictor index and motion vector difference value can be signaled in the bitstream. Motion vectors that are determined based on an indication in the bitstream are defined to be initial motion vectors. In the case of bi-prediction, where the inter-prediction for the current block is obtained as a weighted combination of the predicted blocks of samples which are determined according to two motion vectors, let the initial motion vector in a first reference picture in a first reference picture list L0 be denoted as MV0 and the initial motion vector in a second reference picture in a second reference picture list L1 be denoted as MV1.

Using the initial motion vectors, refinement candidate motion vector (MV) pairs are determined. At least two refinement candidate pairs may be determined. Typically, the refinement candidate motion vector pairs are determined based on the initial motion vector pair (MV0, MV1). Furthermore, the candidate MV pairs may be determined by adding small motion vector differences to MV0 and MV1. For example, the candidate MV pairs might include the following:

$$(MV0, MV1)$$

$$(MV0 + (0, 1), MV1 + (0, -1))$$

$$(MV0 + (1, 0), MV1 + (-1, 0))$$

$$(MV0 + (0, -1), MV1 + (0, 1))$$

$$(MV0 + (-1, 0), MV1 + (1, 0))$$

$$\ldots$$

Where (1,−1) denotes a vector that has a displacement of 1 integer pixel in the horizontal (or x) direction and a displacement of −1 integer pixel in the vertical (or y) direction.

It is noted that the above list of candidate MV pairs are just examples for the sake of illustration and the disclosure is not limited to a specific list of candidates.

Refinement candidate motion vector (MV) pairs form a search space of the motion vector refinement process.

In bi-prediction of a current block, two prediction blocks obtained using the respective first motion vector of list L0 and the second motion vector of list L1, are combined to a single prediction signal or block, which can provide a better adaptation to the original signal than uni-prediction, resulting in less residual information and possibly a more efficient compression.

In motion vector refinement, the two prediction blocks obtained using the respective first motion vector and the second motion vector of a candidate MV pair are compared to each other based on a similarity metric for each of the refinement candidate MV pairs. A candidate MV pair resulting in the highest similarity is usually selected as the refined motion vectors, denoted as MV0' and MV1', i.e. the refined motion vector in a first reference picture in list L0 and the refined motion vector in a second reference picture in list L1, respectively. In other words, predictions are obtained corresponding to a list L0 motion vector and a list L1 motion vector of the candidate motion vector pair, which are then compared to each other based on a similarity metric. The candidate motion vector pair that has the highest associated similarity is selected as the refined MV pair.

Typically, the output of the refinement process are refined MVs. The refined MVs may be the same as the initial MVs or may be different from the initial MVs. Depending on which candidate MV pair achieves the highest similarity, the candidate MV pair formed by the initial MVs is also among the candidate MV pairs. In other words, if the candidate MV pair that achieves the highest similarity is formed by the initial MVs, the refined MVs and the initial MVs are equal to each other.

Instead of selecting the position that maximizes a similarity metric, another method is to select a position that minimizes a dis-similarity metric. The dis-similarity comparison measure might be SAD (Sum of absolute differences), MRSAD (mean removed sum of absolute differences, SSE (Sum of Squared Error) etc. The SAD between two prediction blocks may be obtained using a candidate MV pair (CMV0, CMV1), wherein the SAD can be computed as follows:

$$SAD(CMV0, CMV1) = \sum_{x=0}^{nCbW-1} \sum_{y=0}^{nCbH-1} \text{abs}(predSamplesL0[x][y] - predSamplesL1[x][y])$$

where nCbH and nCbW are the height and the width of the prediction blocks, the function abs(a) specifies the absolute value of the argument a, predSamplesL0 and predSamplesL1 are the prediction block samples obtained according to the candidate MV pair which is denoted by (CMV0, CMV1).

Alternatively, the dis-similarity comparison measure may be obtained by evaluating only a subset of the samples in a prediction block, in order to reduce the number of computations. An example is given below, where rows of samples are alternatively included in the SAD calculation (every second row is evaluated).

$$SAD(CMV0, CMV1) = \sum_{x=0}^{nCbW-1} \sum_{y=0}^{nCbH/2-1} \text{abs}(predSamplesL0[x][2*y] - predSamplesL1[x][2*y])$$

One illustrative example of motion vector refinement is explained in the document JVET-M1001-v3, "Versatile Video Coding (Draft 4)" of JVET (of ITU-T SG 16 WP 3 and ISO/IEC JTC 1/SC 29/WG 11) which is publicly available under http://phenix.it-sudparis.eu/jvet/. The section "8.4.3 Decoder side motion vector refinement process" in the document exemplifies the motion vector refinement.

In order to reduce internal memory requirements for refinement, in some embodiments, the motion vector refinement process may be performed independently on blocks of luma samples obtained by partitioning a coding block of samples that exceeds a certain pre-determined width and/or pre-determined height in luma samples into sub-blocks of samples that are smaller than or equal to the pre-determined width and the pre-determined height in luma. The refined MV pair for each sub-block within a partitioned coding block may be different. Inter-prediction for both luma and chroma are then performed for each sub-block using the refined MV pair of that sub-block.

Each MV of the initial MV pair can have a fractional pixel precision. In other words, the MV indicates a displacement between a current block of samples and a re-sampled reference region and this displacement can point to a fractional position in the horizontal and vertical directions from the integer grid of reconstructed reference samples. Typically, a 2-dimensional interpolation of the integer grid of reconstructed reference sample is performed to obtain the sample values at the fractional sample offset location. The process of obtaining predicted samples from the reconstructed reference pictures using a candidate MV pair may be through one of the following methods:

Round the fractional part of the initial MV pair to the nearest integer location and obtain the integer grid values of the reconstructed reference pictures.

Perform a 2-tap (e.g. bilinear) separable bilinear interpolation to obtain the predicted sample values at the fractional pixel accuracy indicated by the initial MV pair.

Perform a higher tap (e.g. 8-tap or 6-tap) separable interpolation to obtain the predicted sample values at the fractional pixel accuracy indicated by the initial MV pair.

While the candidate MV pairs may have an arbitrary sub-pixel offset with respect to the initial MV pair, in some embodiments, for the sake of simplicity of search, the candidate MV pairs are chosen with integer pixel distance or integer displacement with respect to the initial MV pair. Such candidate MV pairs with integer pixel distance with respect to the initial MV pair may also be used in a first stage of the motion vector refinement (MVR) process, the so-called integer-distance refinement stage of the MVR. In such cases, the predicted samples across all the candidate MV pairs can be obtained by performing a prediction for a block of samples around the initial MV pair to cover all the refinement positions around the initial MV pair.

In some embodiments, once the dis-similarity cost values at all the candidate MV pairs at an integer distance (integer displacement) from the initial MV pair have been evaluated, additional candidate MV pairs at sub-pixel distance offsets from the best cost value position may be added. This second stage may be performed as a fractional-distance refinement stage of the MVR process. Predicted samples may be obtained for each of these positions using one of the methods described above and the dis-similarity costs are evaluated and compared to each other to obtain the position with the lowest dis-similarity cost. In certain other embodiments, to avoid this computationally expensive prediction process for each sub-pixel distance position around the lowest cost integer-distance position, the integer-distance cost values evaluated are stored and a parametric error surface is fitted in the vicinity of the best integer-distance position. The minimum of this error surface is then analytically computed and used as the position with the minimum dis-similarity. In such cases, the dis-similarity cost value is said to be derived from the computed integer-distance cost values.

The application of motion vector refinement for a given coding block of samples may be conditioned on certain coding properties of the coding block of samples. Some examples of such coding properties may include:

The distances in number of pictures (when sampled at a uniform frame-rate), or differences in picture order count (POC), from the current picture to the two reference pictures used for bi-prediction of the coding block of samples are equal and fall on opposite sides of the current picture.

The initial dis-similarity between the two predicted blocks obtained using the initial MV pair is less than a pre-determined per-sample threshold.

Bi-Predictive Optical Flow Refinement (BPOF)

Bi-predictive optical flow (BPOF) or Bi-Directional Optical Flow (BDOF) refinement is a process of improving the accuracy of bi-prediction of a block, without explicit additional signaling in the bitstream other than the signaling for bi-prediction. It is a part of the inter prediction unit 244 in FIGS. 2 and 344 in FIG. 3.

In bi-prediction, 2 inter-predictions are obtained according to two motion vectors, then the predictions are combined by application of weighted averaging. The combined prediction may result in a reduced residual energy as the quantization noise in the two reference patches or blocks get canceled out, thereby providing a higher coding efficiency than uni-prediction. The weighted combination in bi-prediction may be performed according to the following equation:

$$\text{Bi-prediction} = Prediction1 * W1 + Prediction2 * W2 + K,$$

where W1 and W2 are weighting factors that may be signaled in the bitstream or may be predefined at the encoder side and/or at the decoder side. K is an additive factor which may also be signaled in the bitstream or be predefined at the encoder side and/or at the decoder side. As an example, bi-prediction may be obtained using $$\text{Bi-prediction} = (Prediction1 + Prediction2)/2,$$

where W1 and W2 are set to ½ and K is set to 0.

The goal of optical flow refinement is to improve the accuracy of the bi-prediction. Optical flow is the pattern of apparent motion of image objects between two consecutive frames, Optical flow is caused by the movement of the object and/or the camera. The optical flow refinement process improves the accuracy of the bi-prediction by application of an optical flow equation (solving of the optical flow equation).

In an example, a pixel I(x,y,t) is located in a first frame (x and y corresponding to spatial coordinates, t corresponding to time dimension). The object represented by the pixel moves by a distance (dx,dy) in the next frame taken after dt time. Under the assumption that those pixels are the same and the intensity does not change, the optical flow equation is given by:

$$I(x, y, t) = I(x + dx, y + dy, t + dt)$$

where I(x,y,t) specifies the intensity (sample value) of a pixel at the coordinates of (x,y,t).

In another example, for small displacements where higher order terms in a Taylor series expansion are ignored, the optical flow equation may also be written as:

$$\frac{\partial I}{\partial t} + v_x \frac{\partial I}{\partial x} + v_y \frac{\partial I}{\partial y} = 0$$

where $$\frac{\partial I}{\partial x} \text{ and } \frac{\partial I}{\partial y}$$

are the horizontal and vertical spatial sample gradients at position (x,y), $$\frac{\partial I}{\partial t}$$

is the partial temporal derivative at position (x,y), and $v_x = dx/dt$ and $v_y = dy/dt$ represents the speed of the displacement.

The optical flow refinement utilizes the principle above in order to improve the quality of bi-prediction.

In an embodiment, the optical flow refinement includes:
1. Calculating sample gradients;
2. Calculating differences between the first prediction and the second prediction;
3. Calculating the displacement (dx, dy) of pixels or group of pixels that minimizes the error Δ between the two reference patches or blocks using the optical flow equation.

$$\Delta = (I^{(0)} - I^{(1)}) + v_x\left(\tau_0 \frac{\partial I^{(0)}}{\partial x} + \tau_1 \frac{\partial I^{(1)}}{\partial x}\right) + v_y\left(\tau_0 \frac{\partial I^{(0)}}{\partial y} + \tau_1 \frac{\partial I^{(1)}}{\partial y}\right)$$

where $I^{(0)}$ corresponds to a sample value in the first prediction, $I^{(1)}$ is the sample value in the second prediction, $v_x$ and $v_y$ are the displacement velocities calculated in x- and y-directions, and $\partial I^{(0)}/\partial x$, $\partial I^{(0)}/\partial y$, $\partial I^{(1)}/\partial x$ and $\partial I^{(1)}/\partial y$ are the gradients in x- and y-directions in the first and second predictions, respectively. $\tau_1$ and $\tau_0$ denote the temporal distances from the current picture in display order to the respective reference pictures, where the first prediction and the second prediction are obtained. Some approaches minimize the sum of squared errors while some approaches minimize the sum of absolute error.

4. Employing an embodiment of the optical flow equation, such as the one below:

$$pred_{BIO} = 1/2 \cdot (I^{(0)} + I^{(1)} + v_x/2 \cdot (\tau_1 \partial I^{(1)}/\partial x - \tau_0 \partial I^{(0)}/\partial x) + \\ v_y/2 \cdot (\tau_1 \partial I^{(1)}/\partial y - \tau_0 \partial I^{(0)}/\partial y))$$

where $pred_{BIO}$ specifies the modified prediction which is the output of the optical flow refinement process.

Sample gradients may be obtained according to the following formulas:

$$\partial I(x, y, t)/\partial x = I(x+1, y, t) - I(x-1, y, t)$$
$$\partial I(x, y, t)/\partial y = I(x, y+1, t) - I(x, y-1, t)$$

In some embodiments, in order to simplify the complexity of estimating the displacement for each pixel, the displacement is estimated for a group of pixels. In some examples, to compute the improved bi-prediction for a block of 4×4 luma samples, the displacements are estimated using sample values of a block of 8×8 luma samples with the 4×4 block of samples at its center.

The input of the optical flow refinement process are the prediction samples from two reference pictures and the output of the optical flow refinement is the combined prediction (predBIO) which is calculated according to optical flow equation.

One example of an optical flow refinement is explained in the section 8.5.6.4 "Bidirectional optical flow prediction process" of the document JVET-N1001, Versatile Video Coding (Draft 5), which is publicly available under http://phenix.it-sudparis.eu/jvet/ and which is referenced here below for reference.

Inputs to this process are:
two variables nCbW and nCbH specifying the width and the height of the current coding block,
two (nCbW+2)×(nCbH+2) luma prediction sample arrays predSamplesL0 and predSamplesL1,
the prediction list utilization flags predFlagL0 and predFlagL1,
the reference indices refIdxL0 and refIdxL1,
the bidirectional optical flow utilization flags bdofUtilizationFlag[xIdx][yIdx] with xIdx=0 . . . (nCbW>>2)−1, yIdx=0 . . . (nCbH>>2)−1.

Output of this process is the (nCbW)×(nCbH) array pbSamples of luma prediction sample values.

Variables bitDepth, shift1, shift2, shift3, shift4, offset4, and mvRefineThres are derived as follows:
The variable bitDepth is set equal to $BitDepth_Y$, i.e. the bit depth of the luma component.
The variable shift1 is set to equal to Max(6, bitDepth−6).
The variable shift2 is set to equal to Max(4, bitDepth−8).
The variable shift3 is set to equal to Max(1, bitDepth−11).
The variable shift4 is set equal to Max(3, 15−bitDepth) and the variable offset4 is set equal to 1<<(shift4−1).
The variable mvRefineThres is set equal to 1<<Max(5, bitDepth−7).

For xIdx=0 . . . (nCbW>>2)−1 and yIdx=0 . . . (nCbH>>2)−1, the following applies:
The variable xSb is set equal to (xIdx<<2)+1 and ySb is set equal to (yIdx<<2)+1.

If bdofUtilizationFlag[xIdx][yIdx] is equal to FALSE, for x=xSb−1 . . . xSb+2, y=ySb−1 . . . ySb+2, the prediction sample values of the current sub-block are derived as follows:

$pb$Samples[$x$][$y$]=Clip3(0,($2^{bitDepth}$)−1,(predSamplesL0[$x$+1][$y$+1]+offset4+predSamplesL1[$x$+1][$y$+1])>>shift4)

Otherwise (bdofUtilizationFlag[xIdx][yIdx] is equal to TRUE), the prediction sample values of the current sub-block are derived as follows:
For x=xSb−1 . . . xSb+4, y=ySb−1 . . . ySb+4, the following ordered operations apply:
1. The locations (hg, $v_y$) for each of the corresponding sample locations (x, y) inside the prediction sample arrays are derived as follows:

$h_x$=Clip3(1,$nCbW$,$x$)

$v_y$=Clip3(1,$nCbH$,$y$)

2. The variables gradientHL0[x][y], gradientVL0[x][y], gradientHL1[x][y] and gradientVL1[x][y] are derived as follows:

gradient$HL$0[$x$][$y$]=(predSamples$L$0[$h_x$+1][$v_y$]−predSample$L$0[$h_x$−1][$v_y$])>>shift1 gradient$VL$0[$x$][$y$]=(predSample$L$0[$h_x$][$v_y$+1]−predSample$L$0[$h_x$][$v_y$−1])>>shift1 gradient$HL$1[$x$][$y$]=(predSamples$L$1[$h_x$+1][$v_y$]−predSample$L$1[$h_x$−1][$v_y$])>>shift1 gradient$VL$1[$x$][$y$]=(predSample$L$1[$h_x$][$v_y$+1]−predSample$L$1[$h_x$][$v_y$−1])>>shift1

3. The variables diff[x][y], tempH[x][y] and tempV[x][y] are derived as follows:

diff[$x$][$y$]=(predSamples$L$0[$h_x$][$v_y$]>>shift2)−(predSamples$L$1[$h_x$][$v_y$]>>shift2)

temp$H$[$x$][$y$]=(gradient$HL$0[$x$][$y$]+gradient$HL$1[$x$][$y$])>>shift3 temp$V$[$x$][$y$]=(gradient$VL$0[$x$][$y$]+gradient$VL$1[$x$][$y$])>>shift3

The variables sGx2, sGy2, sGxGy, sGxdI and sGydI are derived as follows:

$sGx2=\Sigma_i\Sigma_j$(temp$H$[$xSb+i$][$ySb+j$]*temp$H$[$xSb+i$][$ySb+j$]) with $j$=−1 . . . 4

$sGy2=\Sigma_i\Sigma_j$(temp$V$[$xSb+i$][$ySb+j$]*temp$V$[$xSb+i$][$ySb+j$]) with $j$=−1 . . . 4

$sGxGy=\Sigma_i\Sigma_j$(temp$H$[$xSb+i$][$ySb+j$]*temp$V$[$xSb+i$][$ySb+j$]) with $j$−1 . . . 4

$sGxGy_m=sGxGy$>>12

$sGxGy_s=sGxGy$&((1<<12)−1)

$sGxdI=\Sigma_i\Sigma_j$(−temp$H$[$xSb+i$][$ySb+j$]*diff[$xSb+i$][$ySb+j$]) with $j$=−1 . . . 4

$sGydI=\Sigma_i\Sigma_j$(−temp$V$[$xSb+i$][$ySb+j$]*diff[$xSb+i$][$ySb+j$]) with $j$=−1 . . . 4

The horizontal and vertical motion offsets of the current sub-block are derived as:

$v_x$=$sGx$2>0?Clip3(−mvRefineThres,mvRefineThres,−($sGxdI$<<3)>>Floor(Log 2($sGx$2))):0

$v_y = sGy2>0?\text{Clip3}(-mvRefineThres, mvRefineThres,$
$\quad ((sGydI<<3)-((v_x*sGxGy_m)<<12+v_x*sGx-$
$\quad Gy_s)>>1)>>\text{Floor}(\text{Log }2(sGx2))):0$ For x=xSb−1 . . . xSb+2, y=ySb−1 . . . ySb+2, the prediction sample values of the current sub-block are derived as follows:

$bd\text{ofOffset}=\text{Round}((v_x*(\text{gradient}HL1[x+1][y+1]-\text{gradient}HL0[x+1][y+1]))>>1)+\text{Round}((v_y*(\text{gradient}VL1[x+1][y+1]-\text{gradient}VL0[x+1][y+1]))>>1)$

[Round( ) operation is defined for float input. The Round( ) operation may be omitted here.]

$pb\text{Samples}[x][y]=\text{Clip3}(0,(2^{bitDepth})-1,(\text{predSamples}L0[x+1][y+1]+\text{off set4}+\text{predSamples}L1[x+1][y+1]+bd\text{ofOffset})>>\text{shift4})$ The terms optical flow refinement, bi-predictive optical flow refinement and bidirectional optical flow refinement are used interchangeably in the disclosure, as the terms are equivalent in nature.

Technical Problems that the Disclosure Addresses

In a version of the currently adopted BPOF, a coding unit is partitioned into sub-blocks in order to reduce the memory footprint for BPOF and to allow a sub-block level pipeline to be established in hardware designs. Any coding unit with a width greater than 16 is partitioned horizontally with sub-block width of 16. Any coding unit with a height greater than 16 is partitioned vertically with sub-block height of 16.

Sample gradients are required for all sample positions within a 4×4 block (as described in the background section on BPOF) for computing the optical flow and for applying a correction based on the computed optical flow. Obtaining the 4×4 sample gradients requires extended sample values in both, the references beyond the 4×4 sample values. When using a [−1 0 1] filter for computing the gradients, one extended sample value all around the 4×4 block is required in each reference. In other words, 4×4 sample gradients require a 6×6 sample area (except for the 4 corner samples of the 6×6 area).

At a sub-block level, a sub-block of size M×N requires (M+2)×(N+2) sample values for computing the sample gradients for the M×N sample positions. In order to keep the complexity low, in a version of the currently adopted BPOF, the extended sample values (i.e. the sample positions that fall outside the M×N sample positions corresponding to a sub-block) are not obtained through motion compensated interpolation of the respective reference samples. Instead, the extended sample position at sub-pixel accuracy in each reference picture are obtained, and the fractional parts in the horizontal and vertical direction are ignored to obtain the corresponding integer grid reconstructed reference sample position's sample value in each reference.

These extended sample values are used in the computation of the boundary sample gradients in each reference. Since computation of optical flow of a 4×4 uses sample gradient values and sample values of 6×6 sample positions centered on the 4×4, an extended position's sample gradient value is set to the sample gradient value of the closest sub-block boundary sample. Once the extended sample values obtained from integer grid reconstructed reference sample position values have been used for boundary gradient computation, the sample value of an extended sample is set to the sample value of the closest sub-block boundary sample.

This aspect of removing the fractional part in the horizontal and vertical directions of the sample position to obtain the integer grid reconstructed reference sample value for an extended sample introduces a small compression loss when compared to performing 2-D separable K-tap interpolation with padded samples taking the closest boundary sample value as illustrated in JVET-M0487.

Proposed Method

In this disclosure, a method is proposed that retains the low complexity aspect of obtaining the extended sample value, while nearly eliminating the coding loss introduced by the removal of the fractional horizontal and vertical parts.

Specifically, instead of ignoring the fractional horizontal and vertical offsets of the extended sample position in each reconstructed reference sample grid, the fractional offsets are used to perform a rounding operation in both the horizontal and vertical directions to identify the closest integer sample position in the corresponding reconstructed reference frame's integer-sample grid. The sample value at such an identified position is then assigned to the extended sample.

Figure 8:
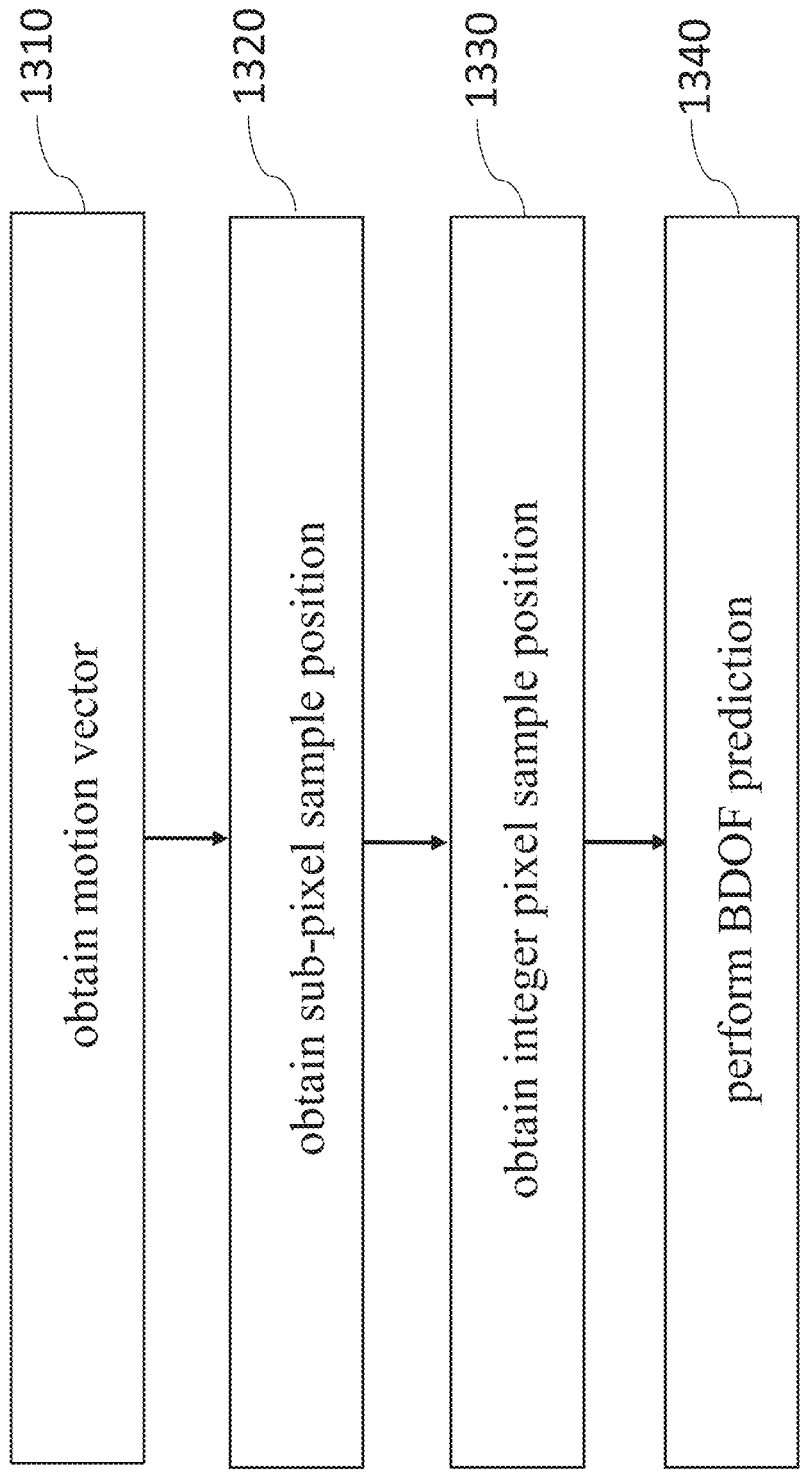
FIG. 8 shows a flowchart for a method of video encoding/decoding according to an embodiment of the disclosure.

In general, a proposed method for bi-directional optical flow prediction based on a sample value from a sample position belonging to an extended region of a predicted block used in the bi-directional optical flow prediction of a current block may be implemented by the following operations as shown in FIG. 8:

Operation 1310, obtaining a motion vector (MV) of the current block;

Operation 1320, obtaining a sub-pixel sample position in an extended region of the predicted block in the reference picture based on the MV;

Wherein the extended region of the predicted block in the reference picture is based on the MV. Particularly, by using the MV, a prediction block with an offset indicated by the MV as reference to the collocated block corresponding to the current block can be found. The extended region is a region that includes at least one row/column of pixels adjacent to and surrounding/encompassing the prediction block. The extended region can be thought of as a padding region that surrounds the prediction block in the reference picture and is used, for instance, for the application of K-tap interpolation filters and/or the calculation of 3-tap sample gradients at the block boundary.

Operation 1330, processing the obtained sub-pixel sample position to obtain an integer pixel sample position in the reference picture; and Operation 1340, performing bi-directional optical flow prediction by referring to a reference sample value at the obtained integer pixel sample position in the reference picture.

The following embodiments exemplify how this method can be implemented.

Embodiment 1

Let the top-left sample of the current sub-block of dimension M×N samples for which bi-prediction with BPOF/BDOF is being performed be located at (sb_start_x, sb_start_y). Let (mvx0, mvy0) be a $\frac{1}{16}^{th}$ of a pixel accurate MV for the current sub-block relative to a first reference frame L0, and (mvx1, mvxy1) be a $\frac{1}{16}^{th}$ of a pixel accurate MV for the current sub-block relative to a second reference frame L1.

The $\frac{1}{16}^{th}$ of a pixel accurate position in L0 corresponding to the top-left position of the current sub-block in L0 is given by ((sb_start_x<<4)+mvx0, (sb_start_y<<4)+mvy0). The $1/16^{th}$ of a pixel accurate position in L1 corresponding to the top-left position of the current sub-block in L0 is given by ((sb_start_x<<4)+mvx1, (sb_start_y<<4)+mvy1). It is understood that different sub-pixel accuracies, such as half-pel, quarter-pel or $1/8^{th}$ of a pel may be used wherein the top-left position of the current sub-blocks is determined by applying corresponding left shift by 1, 2, or 3, respectively.

For the M×N positions in the L0 and L1 reference frames corresponding to a sub-block, 2-D separable K-tap motion compensated interpolation is performed in the respective reference frame based on the sub-pixel accurate, $1/16^{th}$ for example, corresponding sample positions and used as the predicted sample values that are used in the BDOF process to compute sample gradients.

In order to obtain the predicted sample values for the remaining extended corresponding sample positions that fall outside the central M×N sample positions in an (M+2)×(N+2) block of sample positions for the purpose of M×N sub-block boundary sample gradient computation, the following procedure (for general sub-pel sample accuracy) is followed:

Let x_spel_pos be the horizontal sub-pel sample accurate position and y_spel_pos be the vertical sub-pel sample accurate position respectively of an extended sample position. The sample value for this extended sample position is obtained as the reconstructed reference sample value at the position (x_pos, y_pos) computed as follows:

$$x\_pos = (x\_spel\_pos + (1 << (shift\_val - 1))) >> shift\_val$$

$$y\_pos = (y\_spel\_pos + (1 << (shift\_val - 1))) >> shift\_val$$

where shift_val is chosen according to the sub-pel sample accuracy used. For sub-pel sample accuracy of half-pel, quarter-pel, $1/8^{th}$ of a pel, and $1/16^{th}$ of a pel, shift_val of 1, 2, 3, and 4 are used, respectively.

Figure 6:
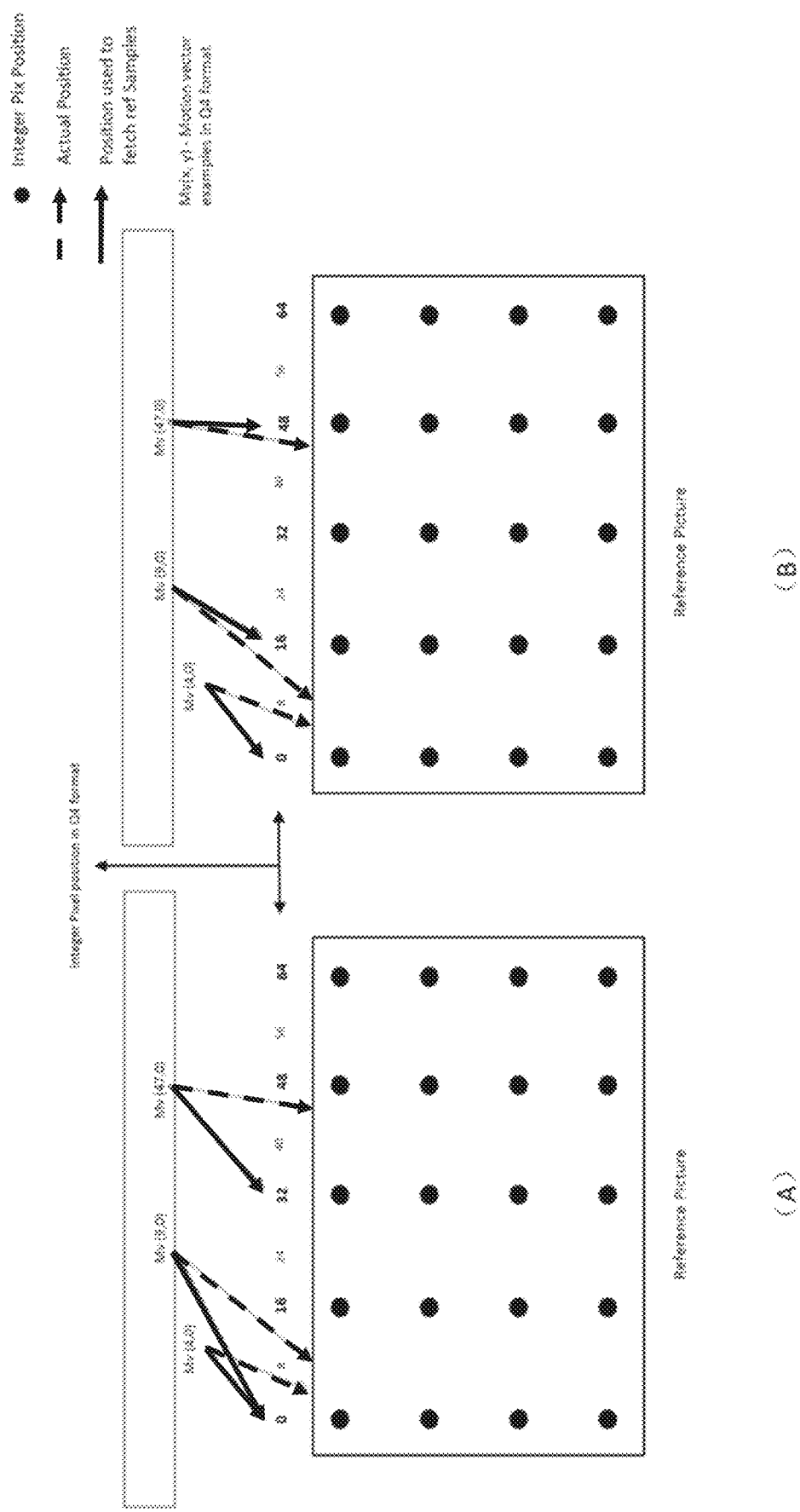
FIG. 6 is a diagram illustrating the sub-pixel positon rounding process in one of the directions in a reference picture used in an integer sample fetching process for gradient calculation of BDOF.
Figure 7:
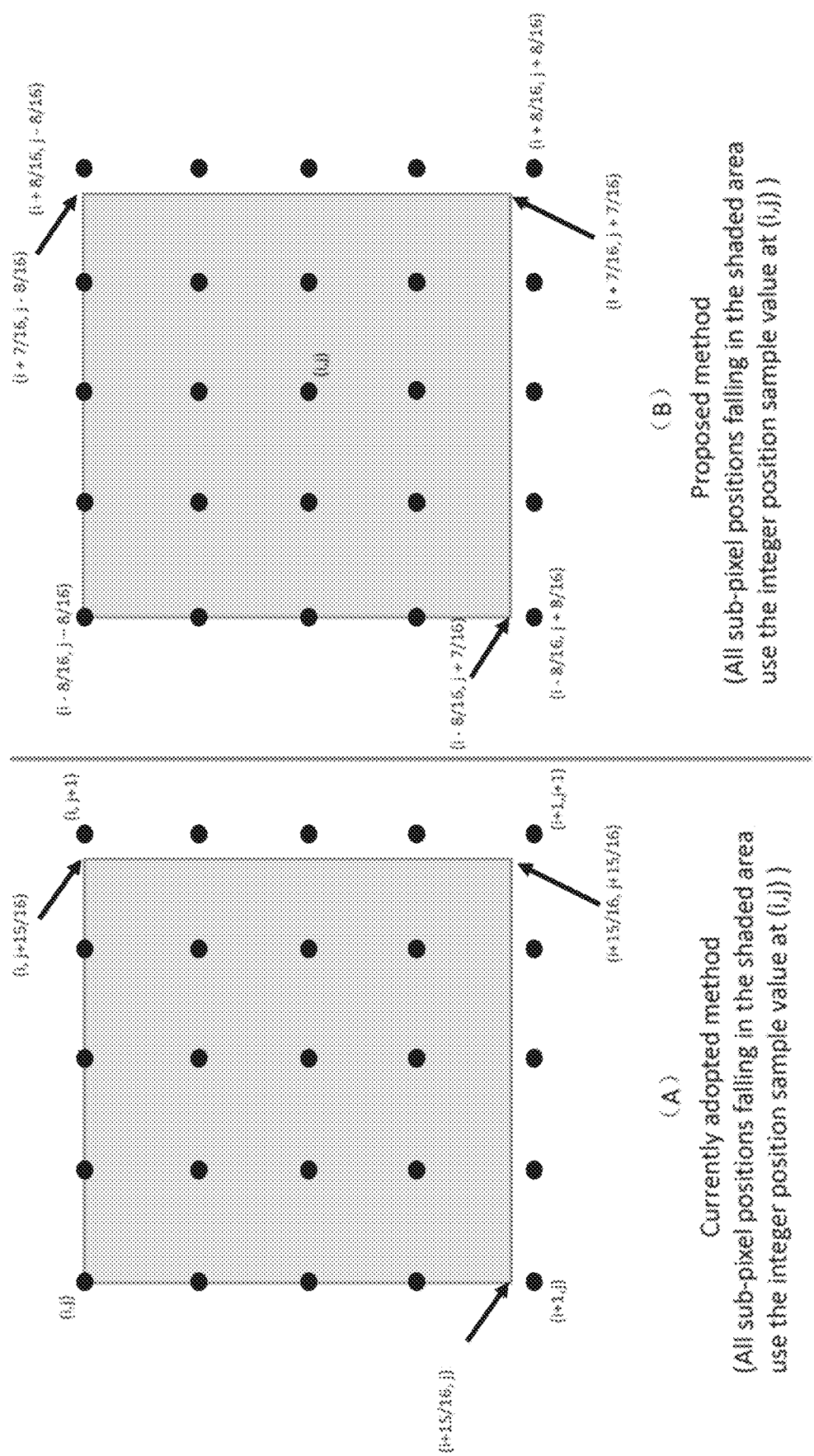
FIG. 7 is a diagram illustrating the integer positons by using the sub-pixel position rounding process in a reference picture in an integer sample fetching process for gradient calculation of BDOF.

By this process of rounding the sub-pel position in the horizontal and vertical directions, the boundary gradients are more accurate as can be seen in FIG. 6 and FIG. 7.

In FIG. 6, it is shown from which position in a reference picture a pixel value is fetched. In diagram (A), showing the state of the art, as an MV pointing to a fractional position in the reference pictures, the fractional part is discarded, and only the integer part is used to fetch the pixel value. For example, for MV (4, 0), MV (9, 0), which are in Q4 format, the (0, 0) position in the reference picture is used for fetching the pixel value (reference sample). In contrast, in diagram (B), according to the present disclosure, the fractional part is considered for rounding to the nearest integer position which is ultimately used to fetch the pixel value. For example, for MV (4, 0), MV (9, 0), which are in Q4 format, position (0, 0) and position (16, 0), respectively, in the reference picture are used for fetching the respective pixel values which can significantly improve the accuracy of fetching the reference sample.

In FIG. 7B, the described method of determining an integer grid reference sample position based on the sub-pixel accurate (i.e. $1/16^{th}$ of a pixel) sample position is illustrated. It can be seen that in the horizontal and vertical directions, the closest integer sample position is chosen based on (half) rounding the horizontal and vertical components of the position. Thus, sub-pixel accurate offsets from (i−8/16) to (i+7/16) in the horizontal direction and from (j−8/16) to (j+7/16) in the vertical direction use (i, j) as the closest integer sample position. Compared to this, FIG. 7A illustrates the issue with selecting the integer sample position via truncation, where a sub-pixel accurate offset from i to (i+15/16) in the horizontal direction and j to (j+15/16) in the vertical direction uses (i, j) as the integer sample position.

At a left boundary sample position of the M×N block, the horizontal boundary sample gradient is computed by taking the difference between the sample value of the position to its right (that is computed using 2-D separable K-tap interpolation) and the sample value of the extended sample position to its left (that is assigned the rounded nearest reconstructed reference sample value as described above). Similarly, at a right boundary sample position of the M×N block, the horizontal boundary sample gradient is computed by taking the difference between the sample value of the position to its right (that is assigned the rounded nearest reconstructed reference sample value as described above) and the sample value of the position to its left (that is computed using 2-D separable K-tap interpolation).

At a top boundary sample position of the M×N block, the vertical boundary sample gradient is computed by taking the difference between the sample value of the position below it (that is computed using 2-D separable K-tap interpolation) and the sample value of the extended sample position above (that is assigned the rounded nearest reconstructed reference sample value as described above). Similarly, at a bottom boundary sample position of the M×N block, the vertical boundary sample gradient is computed by taking the difference between the sample value of the position below it (that is assigned the rounded nearest reconstructed reference sample value as described above) and the sample value of the position above it (that is computed using 2-D separable K-tap interpolation).

Embodiment 2

In this embodiment, the extended sample position values are derived using the procedure described in embodiment 1 whenever BPOF/BDOF is applied and when motion vector refinement (MVR) is not applied for a given coding unit to which a current sub-block belongs, or when MVR and BDOF are both applied for a given coding unit to which a current sub-block belongs, but MVR results in no integer displacement during the integer-distance refinement stage of MVR relative to the initial MV pair. In other words, when MVR and BDOF are both applied, where the integer-distance refinement stage of MVR results in the initial MV pair, i.e. with a zero displacement, the extended sample position values are derived using the procedure described in embodiment 1.

When MVR and BDOF are both applied for a given coding unit to which a current sub-block belongs, but MVR results in an integer displacement during the integer-distance refinement stage of MVR relative to the initial MV pair, i.e. the refined MV pair after the integer-distance refinement stage is different from the initial MV pair, the sample value for an extended sample position (x_spel_pos, y_spel_pos) is obtained as the reconstructed reference sample value at the position (x_pos, y_pos) computed as follows:

$$x\_pos = x\_spel\_pos >> shift\_val$$

$$y\_pos = y\_spel\_pos >> shift\_val$$

where shift_val is chosen according to the sub-pel sample accuracy used. For sub-pel sample accuracy of half-pel, quarter-pel, $1/8^{th}$ of a pel, and $1/16^{th}$ of a pel, shift_val of 1, 2, 3, and 4 are used respectively. In other words, the fractional part of the position in both horizontal and vertical directions is ignored while obtaining the sample position for this case.

Benefits of the Proposed Method

With the described methods of rounding the sub-pel position in the horizontal and vertical directions, the boundary gradients are more accurate. This improves the computed optical flow based on these sample gradients and also the corrections applied using the computed optical flow. This offers a consistent coding gain when compared to the earlier method of ignoring the fractional offset in the horizontal and vertical directions when selecting the integer sample value for the extended sample positions. At the same time, the complexity is not altered much as the addition of a horizontal and vertical rounding offset is the only increase in complexity.

Based on the solution, a possible embodiment in combining the standard VVC draft 5 may be shown as follows.

Luma Integer Sample Fetching Process
Inputs to this process are:
- a luma location in full-sample units ($xInt_L$, $yInt_L$),
- a luma location in fractional-sample units ($xFrac_L$, $yFrac_L$),
- the luma reference sample array $refPicLX_L$, Output of this process is a predicted luma sample value $predSampleLX_L$ The variable shift is set equal to Max(2, 14−$BitDepth_Y$).
The variable picW is set equal to pic_width_in_luma_samples and the variable picH is set equal to pic_height_in_luma_samples.
The luma locations in full-sample units (xInt, yInt) are derived as follows:

$xOffset=xFrac_L>7?1:0$ $yOffset=yFrac_L>7?1:0$ $xInt=Clip3(0,picW-1,sps\_ref\_wraparound\_enabled\_flag!ClipH((sps\_ref\_wraparound\_offset\_minus1+1)*MinCbSizeY,picW,xInt_L-1+xOffset):xInt_L-1+xOffset)$ $yInt=Clip3(0,picH-1,yInt-1+yOffset)$ The predicted luma sample value $predSampleLX_L$ is derived as follows:

$predSampleLX_L=refPicLX_L[xInt][yInt]>>shift3$

It should be noted that these exemplary changes in the VVC draft are only made for the luma component, but they can be used for the chroma component in the same way or with some changes to adopt the characteristic of the chroma component.

FIG. 8 shows a flowchart for a method of video encoding/decoding according to an embodiment of the disclosure. The illustrated method performs bi-directional optical flow prediction based on a sample value from a sample position belonging to an extended region of a predicted block used in the bi-directional optical flow prediction of a current block as follows: In operation 1310, a motion vector (MV) of the current block is obtained. In operation 1320, a sub-pixel sample position in the extended region of the predicted block in the reference picture is obtained based on the MV. In step 1330, the obtained sub-pixel sample position is processed, in particular rounded, to obtain an integer pixel sample position in the reference picture. In operation 1340, finally, and bi-directional optical flow prediction is performed by referring to a reference sample value at the obtained integer pixel sample position in the reference picture.

Figure 9:
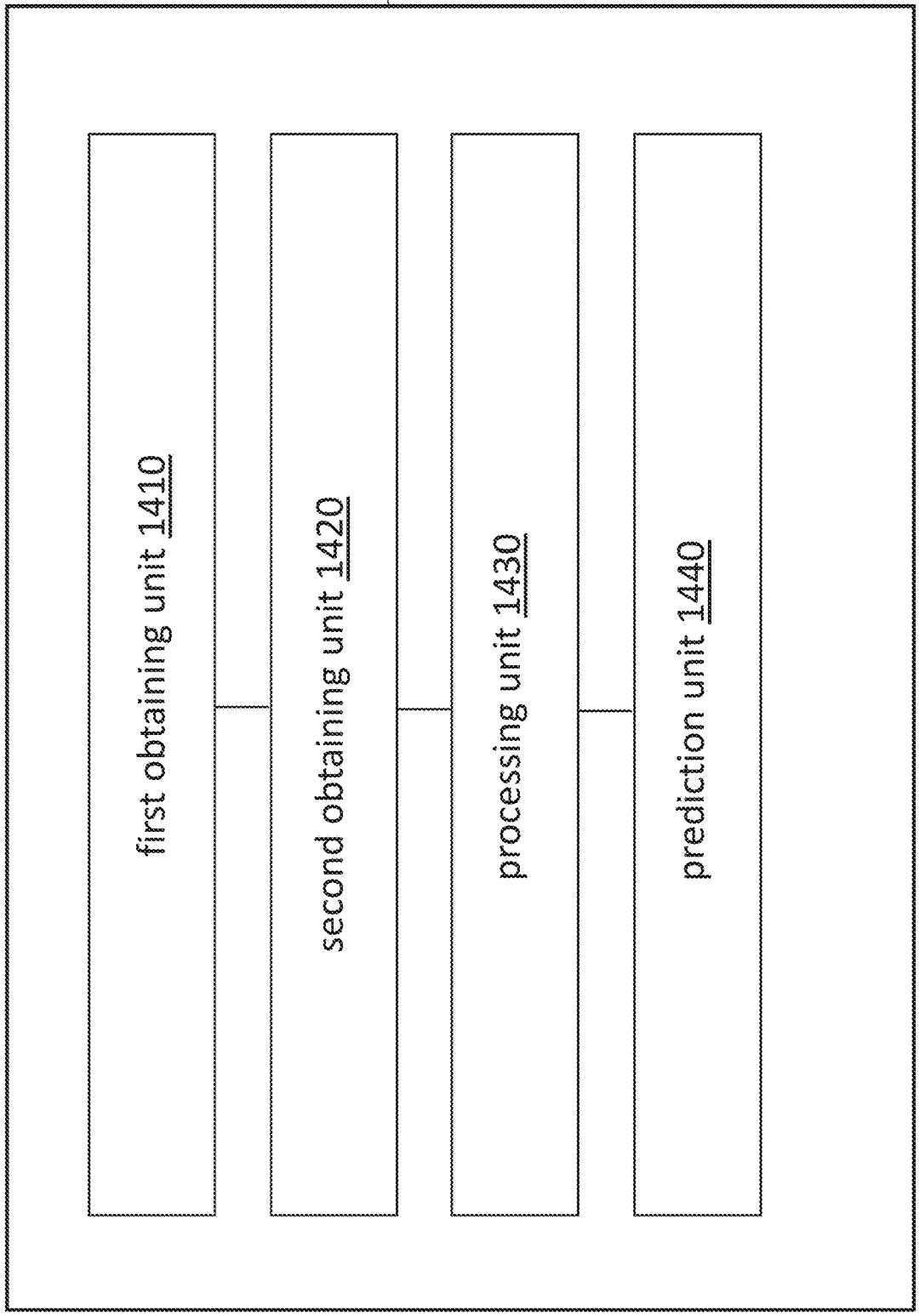
FIG. 9 shows a block diagram illustrating an example of an encoding/decoding apparatus according to an embodiment of the disclosure.

FIG. 9 shows a block diagram illustrating an example of an encoding/decoding apparatus according to an embodiment of the disclosure. The encoding/decoding apparatus 20/30 comprises a prediction unit 1440 configured to perform bi-directional optical flow prediction of a current block, a first obtaining unit 1410 configured to obtain a motion vector (MV) of the current block, a second obtaining unit 1420 configured to obtain a sub-pixel sample position in an extended region of a predicted block in a reference picture based on the MV, and a processing unit 1430 configured to process, in particular round, the obtained sub-pixel sample position to obtain an integer pixel sample position in the reference picture, wherein the prediction unit 1440 is configured to perform the bi-directional optical flow prediction by referring to a reference sample value at the obtained integer pixel sample position in the reference picture.

The obtaining units 1410 and 1420, the processing unit 1430, and the prediction unit 1440 may be implemented in hardware, software, firmware, or any combination thereof. If implemented in software, the functions may be stored on a computer-readable medium or transmitted over communication media as one or more instructions or code and executed by a hardware-based processing unit. Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for embodiment of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

Some particular embodiments are outlined in the following aspects of the disclosure.

According to a first aspect, a method used for obtaining a predicted sample value for a sample position belonging to the extended region of a predicted block used in bi-directional optical flow prediction of a current coding block is provided, which comprises obtaining an MV of the current coding block, obtaining a sub-pixel position in the reference picture based on the MV and an extended sample position in the current picture that surrounds the sample positions of the current coding block, obtaining an integer pixel location in the reference picture by rounding/relocating the obtained sub-pixel sample position towards a nearest integer pixel local, and setting the predicted sample value for a sample position belonging to the extended region of the predicted block as the reference sample value at the obtained integer pixel location.

The rounding/relocating the obtained sub-pixel sample position towards a nearest integer pixel local may include rounding the obtained sub-pixel sample position separately in the horizontal and vertical directions to the closest integer sample position in that direction, with the half-sample position between two integer sample positions being rounded up to the higher integer sample position in that direction.

The rounding/relocating the obtained sub-pixel sample position towards a nearest integer pixel local may include comparing the obtained sub-pixel sample position separately in the horizontal and vertical directions with a threshold, in a case in which the sub-pixel sample position is equal to or bigger than the threshold, a nearest higher integer sample position may be obtained as the integer pixel location, and in a case in which the sub-pixel sample position is smaller than the threshold, a nearest lower integer sample position may be obtained as the integer pixel location.

According to a second aspect, a method used for obtaining a predicted sample value for a sample position belonging to the extended region of a predicted block used in bi-directional optical flow prediction of a current coding block is provided, which comprises obtaining a first MV corresponding to the predicted sample within the extended region of the coding block, obtaining a second MV by discarding the fractional part of the first MV, obtaining a first integer pixel location of the extended region in a reference picture based on the second MV, determining a fractional offset vector based on the first MV, obtaining a second integer pixel location in the reference picture based on the first integer pixel location and the fractional offset vector, wherein the second integer pixel location is set to be the first integer pixel position plus a position offset, where the position offset is determined by comparison between each component of the fractional offset vector and a threshold, and further comprising padding the predicted sample by using a pixel value in the second integer pixel location in the reference picture.

Whether a component of the position offset is 1 or 0 may depend on the result of the comparison between the corresponding component of the fractional offset vector and the threshold, wherein the component includes an X component and a Y component.

The threshold may be K, wherein a component of the position offset is set to be 1 when the corresponding component of the fractional offset is equal to or bigger than K, otherwise, to be 0. K may be equal to 8.

According to a further aspect, an encoder or a decoder is provided comprising processing circuitry for carrying out any one of the methods according to the above-described first and second aspects.

According to a further aspect, a computer program product is provided comprising a program code for performing any one of the methods according to the above-described first and second aspects.

According to a further aspect, a decoder or an encoder is provided, comprising one or more processors, and a non-transitory computer-readable storage medium coupled to the processors and storing programming for execution by the processors, wherein the programming, when executed by the processors, configures the decoder to carry out any one of the methods according to the above-described first and second aspects.

Mathematical Operators

The mathematical operators used in this application are similar to those used in the C programming language. However, the results of integer division and arithmetic shift operations are defined more precisely, and additional operations are defined, such as exponentiation and real-valued division. Numbering and counting conventions generally begin from 0, i.e. "the first" is equivalent to the 0-th, "the second" is equivalent to the 1st, etc.

Arithmetic Operators

The following arithmetic operators are defined as follows:

| | |
|---|---|
| + | Addition |
| − | Subtraction (as a two-argument operator) or negation (as a unary prefix operator) |
| * | Multiplication, including matrix multiplication |
| $x^y$ | Exponentiation. Specifies x to the power of y. In other contexts, such notation is used for superscripting not intended for interpretation as exponentiation. |
| / | Integer division with truncation of the result toward zero. For example, 7/4 and −7/−4 are truncated to 1 and −7/4 and 7/−4 are truncated to −1. |
| ÷ | Used to denote division in mathematical equations where no truncation or rounding is intended. |
| $\frac{x}{y}$ | Used to denote division in mathematical equations where no truncation or rounding is intended. |
| $\sum_{i=x}^{y} f(i)$ | The summation of f(i) with i taking all integer values from x up to and including y. |
| x % y | Modulus. Remainder of x divided by y, defined only for integers x and y with x >= 0 and y > 0. |

Logical Operators

The following logical operators are defined as follows:
x && y Boolean logical "and" of x and y
x∥y Boolean logical "or" of x and y
! Boolean logical "not"
x?y:z If x is TRUE or not equal to 0, evaluates to the value of y; otherwise, evaluates to the value of z.

Relational Operators

The following relational operators are defined as follows:
> Greater than
>= Greater than or equal to
< Less than
<= Less than or equal to
== Equal to
!= Not equal to When a relational operator is applied to a syntax element or variable that has been assigned the value "na" (not applicable), the value "na" is treated as a distinct value for the syntax element or variable. The value "na" is considered not to be equal to any other value.

Bit-Wise Operators

The following bit-wise operators are defined as follows:

& Bit-wise "and". When operating on integer arguments, operates on a two's complement representation of the integer value. When operating on a binary argument that contains fewer bits than another argument, the shorter argument is extended by adding more significant bits equal to 0.

| Bit-wise "or". When operating on integer arguments, operates on a two's complement representation of the integer value. When operating on a binary argument that contains fewer bits than another argument, the shorter argument is extended by adding more significant bits equal to 0.

^ Bit-wise "exclusive or". When operating on integer arguments, operates on a two's complement representation of the integer value. When operating on a binary argument that contains fewer bits than another argument, the shorter argument is extended by adding more significant bits equal to 0.

x>>y Arithmetic right shift of a two's complement integer representation of x by y binary digits. This function is defined only for non-negative integer values of y. Bits shifted into the most significant bits (MSBs) as a result of the right shift have a value equal to the MSB of x prior to the shift operation.

x<<y Arithmetic left shift of a two's complement integer representation of x by y binary digits. This function is defined only for non-negative integer values of y. Bits shifted into the least significant bits (LSBs) as a result of the left shift have a value equal to 0.

Assignment Operators

The following arithmetic operators are defined as follows:

= Assignment operator

++ Increment, i.e., x++ is equivalent to x=x+1; when used in an array index, evaluates to the value of the variable prior to the increment operation.

-- Decrement, i.e., x-- is equivalent to x=x−1; when used in an array index, evaluates to the value of the variable prior to the decrement operation.

+= Increment by amount specified, i.e., x+=3 is equivalent to x=x+3, and x+=(−3) is equivalent to x=x+(−3).

−= Decrement by amount specified, i.e., x−=3 is equivalent to x=x−3, and x−=(−3) is equivalent to x=x−(−3).

Range Notation

The following notation is used to specify a range of values:

x=y . . . z x takes on integer values starting from y to z, inclusive, with x, y, and z being integer numbers and z being greater than y.

Mathematical Functions

The following mathematical functions are defined:

$$\mathrm{Abs}(x) = \begin{cases} x; & x \geq 0 \\ -x; & x < 0 \end{cases}$$

A sin(x) the trigonometric inverse sine function, operating on an argument x that is in the range of −1.0 to 1.0, inclusive, with an output value in the range of −π÷2 to π÷2, inclusive, in units of radians.

A tan(x) the trigonometric inverse tangent function, operating on an argument x, with an output value in the range of −π÷2 to π÷2, inclusive, in units of radians.

$$\mathrm{Atan2}(y, x) = \begin{cases} \mathrm{Atan}\left(\frac{y}{x}\right); & x > 0 \\ \mathrm{Atan}\left(\frac{y}{x}\right) + \pi; & x < 0 \,\&\&\, y \geq 0 \\ \mathrm{Atan}\left(\frac{y}{x}\right) - \pi; & x < 0 \,\&\&\, y < 0 \\ +\frac{\pi}{2}; & x == 0 \,\&\&\, y \geq 0 \\ -\frac{\pi}{2}; & \text{otherwise} \end{cases}$$

Ceil(x) the smallest integer greater than or equal to x.

$$\mathrm{Clip1}_Y = \mathrm{Clip3}(0, (1 \ll \mathrm{BitDepth}_Y) - 1, x)$$

$$\mathrm{Clip1}_C = \mathrm{Clip3}(0, (1 \ll \mathrm{BitDepth}_C)1, x)$$

$$\mathrm{Clip3}(x, y, z) = \begin{cases} x; & z < x \\ y; & z > y \\ z; & \text{otherwise} \end{cases}$$

Cos(x) the trigonometric cosine function operating on an argument x in units of radians.

Floor(x) the largest integer less than or equal to x.

$$\mathrm{GetCurrMsb}(a, b, c, d) = \begin{cases} c + d; & b - a \geq d/2 \\ c - d; & a - b > d/2 \\ c; & \text{otherwise} \end{cases}$$

Ln(x) the natural logarithm of x (the base-e logarithm, where e is the natural logarithm base constant 2.718 281 828 . . . ).

Log 2(x) the base-2 logarithm of x.

Log 10(x) the base-10 logarithm of x.

$$\mathrm{Min}(x, y) = \begin{cases} x; & x \leq y \\ y; & x > y \end{cases}$$

$$\mathrm{Max}(x, y) = \begin{cases} x; & x \geq y \\ y; & x < y \end{cases}$$

$$\mathrm{Round}(x) = \mathrm{Sign}(x) * \mathrm{Floor}(\mathrm{Abs}(x) + 0.5)$$

$$\mathrm{Sign} = \begin{cases} 1; & x > 0 \\ 0; & x == 0 \\ -1; & x < 0 \end{cases}$$

Sin(x) the trigonometric sine function operating on an argument x in units of radians $$\mathrm{Sqrt}(x) = \sqrt{x}$$

$$\mathrm{Swap}(x, y) = (y, x)$$

Tan(x) the trigonometric tangent function operating on an argument x in units of radians Order of Operation Precedence When an order of precedence in an expression is not indicated explicitly by use of parentheses, the following rules apply:

Operations of a higher precedence are evaluated before any operation of a lower precedence.

Operations of the same precedence are evaluated sequentially from left to right.

The table below specifies the precedence of operations from highest to lowest; a higher position in the table indicates a higher precedence.

For those operators that are also used in the C programming language, the order of precedence used in this Specification is the same as used in the C programming language.

TABLE

Operation precedence from highest (at top of table) to lowest (at bottom of table) operations (with operands x, y, and z)

"x++", "x− −"

"!x", "−x" (as a unary prefix operator)

$x^y$

"x ∗ y", "x / y", "x ÷ y", "$\frac{x}{y}$", "x % y"

"x + y", "x − y" (as a two-argument operator), "$\sum_{i=x}^{y} f(i)$"

"x << y", "x >> y"

"x < y", "x <= y", "x > y", "x >= y"

"x = = y", "x != y"

"x & y"

"x | y"

"x && y"

"x || y"

"x ? y : z"

"x..y"

"x = y", "x += y", "x −= y"

Text Description of Logical Operations

In the text, a statement of logical operations as would be described mathematically in the following form:

```
if( condition 0 )
    statement 0
else if( condition 1 )
    statement 1
...
else /* informative remark on remaining condition */
    statement n
may be described in the following manner:
    ... as follows/ ... the following applies:
        If condition 0, statement 0
        Otherwise, if condition 1, statement 1
        ...
        Otherwise (informative remark on remaining condition),
        statement n
```

Each "If . . . Otherwise, if . . . Otherwise, . . . " statement in the text is introduced with " . . . as follows" or " . . . the following applies" immediately followed by "If . . . ". The last condition of the "If . . . Otherwise, if . . . Otherwise, . . . " may always be an "Otherwise, . . . ". Interleaved "If . . . . Otherwise, if . . . Otherwise, . . . " statements can be identified by matching " . . . as follows" or " . . . the following applies" with the ending "Otherwise, . . . ".

In the text, a statement of logical operations as would be described mathematically in the following form:

```
if( condition 0a && condition 0b )
    statement 0
else if( condition 1a || condition 1b )
    statement 1
...
else
    statement n
may be described in the following manner:
    ... as follows / ... the following applies:
        If all of the following conditions are true, statement 0:
            condition 0a
            condition 0b
        Otherwise, if one or more of the following conditions
        are true, statement 1:
            condition 1a
            condition 1b
        ...
        Otherwise, statement n
```

In the text, a statement of logical operations as would be described mathematically in the following form:

```
if( condition 0 )
    statement 0
if( condition 1 )
    statement 0
may be described in the following manner:
    When condition 0, statement 0
    When condition 1, statement 1
```

Although embodiments of the disclosure have been primarily described based on video coding, it should be noted that embodiments of the coding system 10, encoder 20 and decoder 30 (and correspondingly the system 10) and the other embodiments described herein may also be configured for still picture processing or coding, i.e. the processing or coding of an individual picture independent of any preceding or consecutive picture as in video coding. In general only inter-prediction units 244 (encoder) and 344 (decoder) may not be available in case the picture processing coding is limited to a single picture 17. All other functionalities (also referred to as tools or technologies) of the video encoder 20 and the video decoder 30 may equally be used for still picture processing, e.g. residual calculation 204/304, transform 206, quantization 208, inverse quantization 210/310, (inverse) transform 212/312, partitioning 262, intra-prediction 254/354, and/or loop filtering 220, 320, and entropy coding 270 and entropy decoding 304.

Embodiments, e.g. of the encoder 20 and the decoder 30, and functions described herein, e.g. with reference to the encoder 20 and the decoder 30, may be implemented in hardware, software, firmware, or any combination thereof. If implemented in software, the functions may be stored on a computer-readable medium or transmitted over communication media as one or more instructions or code and executed by a hardware-based processing unit. Computer-readable media may include computer-readable storage media, which correspond to tangible media such as data storage media, or communication media including any medium that facilitates transfer of a computer program from one place to another, e.g., according to a communication protocol. In this manner, computer-readable media generally may correspond to (1) tangible computer-readable storage media which are non-transitory or (2) a communication medium such as a signal or carrier wave. Data storage media may be any available media that can be accessed by one or more computers or one or more processors to retrieve instructions, code and/or data structures for embodiment of the techniques described in this disclosure. A computer program product may include a computer-readable medium.

By way of example, and not limiting, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, include compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for embodiment of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

The invention claimed is:

1. A video coding device for bi-directional optical flow prediction, comprising:
one or more processors; and
a non-transitory computer-readable storage medium coupled to the one or more processors and storing instructions, which when executed by the one or more processors, cause the video coding device to perform operations, the operations comprising:
obtaining a motion vector (MV) of a current block;
obtaining a sub-pixel sample position in an extended region of a predicted block in a reference picture based on the MV;
processing the obtained sub-pixel sample position to obtain an integer pixel sample position in the reference picture; and
performing bi-directional optical flow prediction by referencing a reference sample value at the obtained integer pixel sample position in the reference picture,
wherein processing the obtained sub-pixel sample position comprises:
rounding the obtained sub-pixel sample position separately in a horizontal direction and a vertical direction to respective closest integer pixel sample positions in the respective horizontal and vertical directions, and obtaining the integer pixel sample position in the reference picture based on the closest integer pixel sample positions in the horizontal direction and the vertical direction,
wherein the sub-pixel sample position and the integer pixel sample position are luma sample positions.

2. The video coding device of claim 1, wherein the reference sample value at the obtained integer pixel sample position in the reference picture is referenced as a sample value from the sub-pixel sample position in the bi-directional optical flow prediction.

3. The video coding device of claim 1, wherein processing the obtained sub-pixel sample position comprises rounding the obtained sub-pixel sample position to obtain the integer pixel sample position in the reference picture.

4. The video coding device of claim 1, wherein the operations further comprise:
before performing the bi-directional optical flow prediction, fetching the reference sample value at the obtained integer pixel sample position in the reference picture as a prediction sample value to be used in the bi-directional optical flow prediction,
wherein performing the bi-directional optical flow prediction comprises:
performing the bi-directional optical flow prediction using the prediction sample value.

5. The video coding device of claim 1, wherein rounding the obtained sub-pixel sample position separately in the horizontal direction and the vertical direction comprises:
comparing a fractional part of the obtained sub-pixel sample position in a respective direction with a threshold,
wherein when the fractional part is equal to or greater than the threshold, a nearest higher integer pixel sample position in the respective direction is obtained as a closest integer pixel sample position in the respective direction, and
wherein when the fractional part is less than the threshold, a nearest lower integer pixel sample position in the respective direction is obtained as the closest integer pixel sample position in the respective direction.

6. The video coding device of claim 5, wherein
the nearest higher integer pixel sample position in the respective direction is obtained by adding an offset of 1 to a truncated integer pixel sample position in the respective direction obtained by discarding the fractional part of the obtained sub-pixel sample position; and
the nearest lower integer pixel sample position in the respective direction is obtained by adding an offset of 0 to the truncated integer pixel sample position in the respective direction obtained by discarding the fractional part of the obtained sub-pixel sample position.

7. The video coding device of claim 5, wherein the threshold is given by P/2 for a 1/P sub-pixel accuracy.

8. The video coding device of claim 7, wherein the threshold is 8 for $\frac{1}{16}$ sub-pixel accuracy.

9. The video coding device of claim 1, wherein rounding the obtained sub-pixel sample position separately in the horizontal direction and the vertical direction comprises:
applying a shifting operation to components of the obtained sub-pixel sample position in the respective horizontal and vertical directions.

10. The video coding device of claim 9, wherein the integer pixel sample position (x_pos, y_pos) in the reference picture is obtained according to the following:

$$x\_pos = (x\_spel\_pos + (1 << (shift\_val - 1))) >> shift\_val$$

$$y\_pos = (y\_spel\_pos + (1 << (shift\_val - 1))) >> shift\_val$$

where (x_spel_pos, y_spel_pos) is the obtained sub-pixel sample position and shift_val is chosen according to a sub-pel sample accuracy used.

11. The video coding device of claim 10, wherein for sub-pel sample accuracy of half-pel, quarter-pel, $\frac{1}{8}^{th}$ of a pel, or $\frac{1}{16}^{th}$ of a pel, shift_val of 1, 2, 3, or 4 are used respectively.

12. The video coding device of claim 1, wherein the MV of the current block is a refined MV, obtained by motion vector refinement (MVR) based on an initial MV.

13. The video coding device of claim 12, wherein
the MVR comprises an integer-distance refinement stage with regard to the initial MV; and when the integer-distance refinement stage of the MVR results in a non-zero displacement of the refined MV with respect to the initial MV, the integer pixel sample position in the reference picture is obtained by rounding the obtained sub-pixel sample position.

14. The video coding device of claim 13, wherein when the integer-distance refinement stage of the MVR results in a zero displacement of the refined MV with respect to the initial MV, the integer pixel sample position in the reference picture is obtained by discarding a fractional part of the obtained sub-pixel sample position.

15. The video coding device of claim 13, wherein, in case the integer-distance refinement stage of the MVR results in a zero displacement of the refined MV with respect to the initial MV, the integer pixel sample position (x_pos, y_pos) in the reference picture is obtained according to the following equations:

$$x\_pos = x\_spel\_pos >> shift\_val$$

$$y\_pos = y\_spel\_pos >> shift\_val$$

where (x_spel_pos, y_spel_pos) is the obtained sub-pixel sample position and shift_val is chosen according to the sub-pel sample accuracy used.

16. The video coding device of claim 1, wherein the current block is a current coding block or a current coding sub-block or a current prediction block.

17. The video coding device of claim 1, wherein the reference sample value at the obtained integer pixel sample position in the reference picture is used in the computation of a boundary sample gradient corresponding to a boundary of the predicted block in the reference picture.

18. A method, performed by an encoding device or a decoding device, for bi-directional optical flow prediction, the method comprising:
obtaining a motion vector (MV) of a current block;
obtaining a sub-pixel sample position in an extended region of a predicted block in a reference picture based on the MV;
processing the obtained sub-pixel sample position to obtain an integer pixel sample position in the reference picture; and
performing bi-directional optical flow prediction by referencing a reference sample value at the obtained integer pixel sample position in the reference picture,
wherein processing the obtained sub-pixel sample position comprises:
rounding the obtained sub-pixel sample position separately in a horizontal direction and a vertical direction to respective closest integer pixel sample positions in the respective horizontal and vertical directions, and obtaining the integer pixel sample position in the reference picture based on the closest integer pixel sample positions in the horizontal direction and the vertical direction,
wherein the sub-pixel sample position and the integer pixel sample position are luma sample positions.

19. A non-transitory computer-readable storage medium storing a computer program, which when executed by a processor, cause the processor to perform operations, the operations comprising:
obtaining a motion vector (MV) of a current block;
obtaining a sub-pixel sample position in an extended region of a predicted block in a reference picture based on the MV;
processing the obtained sub-pixel sample position to obtain an integer pixel sample position in the reference picture; and
performing bi-directional optical flow prediction by referencing a reference sample value at the obtained integer pixel sample position in the reference picture,
wherein processing the obtained sub-pixel sample position comprises:
rounding the obtained sub-pixel sample position separately in a horizontal direction and a vertical direction to respective closest integer pixel sample positions in the respective horizontal and vertical directions, and obtaining the integer pixel sample position in the reference picture based on the closest integer pixel sample positions in the horizontal direction and the vertical direction,
wherein the sub-pixel sample position and the integer pixel sample position are luma sample positions.

* * * * *